(12) United States Patent
Klosterman et al.

(10) Patent No.: US 7,797,712 B2
(45) Date of Patent: Sep. 14, 2010

(54) INFORMATION SYSTEM

(75) Inventors: Brian Lee Klosterman, San Ramon, CA (US); Steven Schein, Menlo Park, CA (US)

(73) Assignee: StarSight Telecast Inc., Freemont, CA (US)

( * ) Notice: Subject to any disclaimer, the term of this patent is extended or adjusted under 35 U.S.C. 154(b) by 0 days.

(21) Appl. No.: 12/164,562

(22) Filed: Jun. 30, 2008

(65) Prior Publication Data
US 2008/0271071 A1    Oct. 30, 2008

Related U.S. Application Data

(63) Continuation of application No. 10/251,670, filed on Sep. 20, 2002, now Pat. No. 7,421,724, which is a continuation of application No. 08/846,802, filed on Apr. 30, 1997, now Pat. No. 6,469,753.

(60) Provisional application No. 60/032,038, filed on Nov. 26, 1996, provisional application No. 60/016,871, filed on May 3, 1996.

(51) Int. Cl.
*H04N 5/445*     (2006.01)
*G06F 13/00*     (2006.01)
*G06F 3/00*      (2006.01)

(52) U.S. Cl. .............................. 725/43; 725/47; 725/52
(58) Field of Classification Search ............. 725/40–43, 725/44, 46, 47, 52
See application file for complete search history.

(56) References Cited

U.S. PATENT DOCUMENTS 5,907,323 A * 5/1999 Lawler et al. .................. 725/41
6,177,931 B1 * 1/2001 Alexander et al. ............ 725/52

* cited by examiner

*Primary Examiner*—Hunter B. Lonsberry
(74) *Attorney, Agent, or Firm*—Ropes & Gray LLP; Gall C. Gotfried

(57) ABSTRACT

A system and method for displaying an electronic program schedule guide is provided. The system has areas for displaying program schedule information. In addition, the system also has areas that may be used for advertising programs, products or services. In another embodiment, the system has areas for displaying messages to the user.

20 Claims, 27 Drawing Sheets

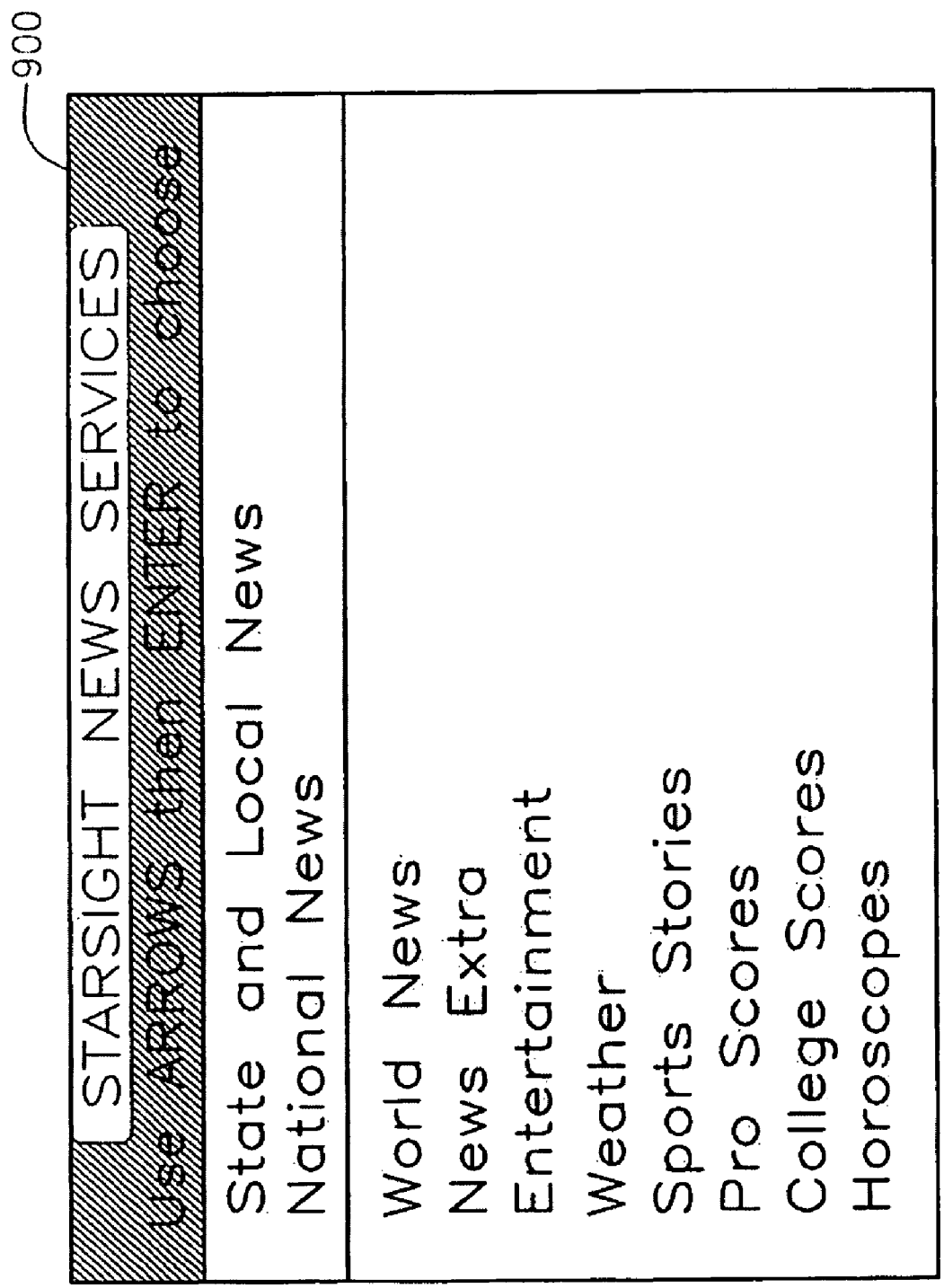

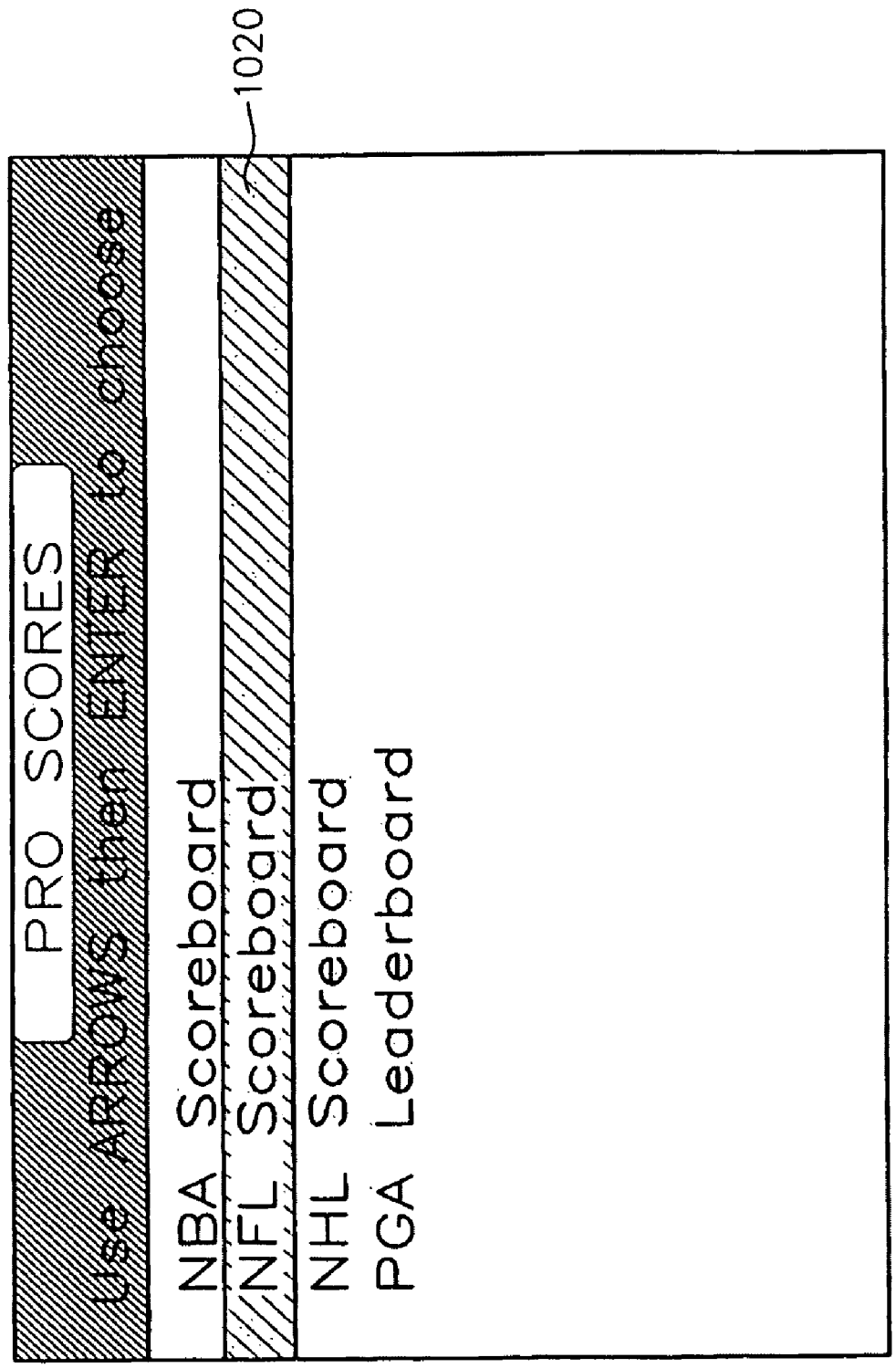

FIG.10c

| PRO SCORES / NFL SCOREBOARD | | | |
|---|---|---|---|
| SF 10 / Hou 9 | Bal 37 F / Stl 31 | | |
| Pit 20 / Atl 17 | Det 7 F / NYG 35 | | |
| GB 13 / Tam 7 | Was 31 F / Ind 16 | | |
| Phi 20 / Car 9 | Cin 28 F / Jac 21 ▶ | | |

1040

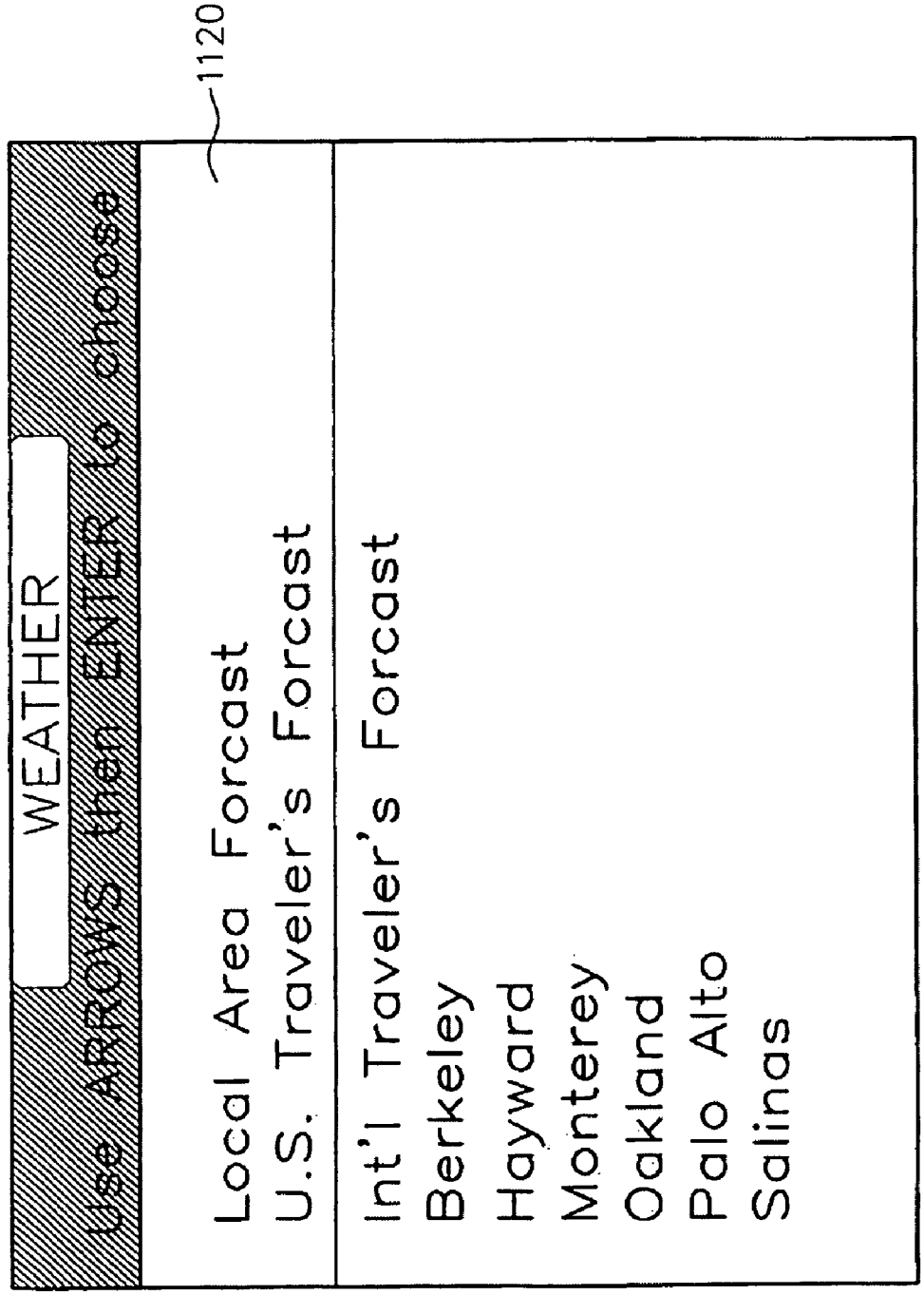

FIG.11c

WEATHER

U.S. Traveler's Forecast — 1140

WEDNESDAY
Alburquerque
58/36 PSunny
Anchorage
16/6 PSunny
Atlanta
72/56 PSunny
Boston
66/48 MSunny
Chicago
68/50 PSunny THURSDAY
46/29 Damp
22/17 Lt.Snow
79/60 PCloudy
64/47 PSunny
66/49 PCloudy

INFORMATION SYSTEM

CROSS-REFERENCE TO RELATED APPLICATIONS

This application is a continuation of U.S. patent application Ser. No. 10/251,670, filed Sep. 20, 2002, which is a continuation of U.S. patent application Ser. No. 08/846,802, filed Apr. 30, 1997, which is a nonprovisional application of U.S. provisional patent application No. 60/016,871, filed May 3, 1996, and U.S. provisional patent application No. 60/032,038, filed Nov. 26, 1996, each of which is hereby incorporated by reference herein in its entirety.

BACKGROUND OF THE INVENTION

The present invention relates generally to a program schedule guide and, more particularly, to a system and process for allowing a television viewer to access on-screen television program listings and other information services in an easy and convenient way.

The number of television channels available to a user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

Given the hectic lifestyle of today's society, a system which provides other information in addition to television program schedule information would be very convenient for the busy viewer. Examples of information viewers may desire are weather information, financial information, and the like. Hence, an information system such as a guide with regions reserved for such information would provide a valuable service to a user. Furthermore, these regions could be used for advertising or promotional purposes, which may or may not be interactive, thereby enabling more services to be provided without increasing the cost of the guide.

SUMMARY OF THE INVENTION

The system and method of the present invention provides a program schedule guide with information regions for displaying additional information. Alternatively, the additional information may be provided by a separate information guide, and a user may "hypertune" from the program schedule guide to the information guide, and vice versa. The information to be displayed is received by a peripheral device which can either be a stand-alone device, such as a set-top box or a web-browser box; or integrated into the user's television, VCR, computer, satellite IRD, cable box, and the like. In addition, the information may be displayed on a computer screen, a television screen, or a television monitor screen.

In a preferred embodiment of the invention, the program guide interactively displays a program schedule guide and the screen contains additional non-interactive information regions which can be used for displaying advertising or promotional messages for products or programs in a static or scrolling manner. The advertising may be for special programming events such as pay-per-view movies, current or upcoming programs, or for merchandise and services or messages to the user. The promotional information may relate to an individual network/broadcaster, or for a selected program, merchandise or services.

In another preferred embodiment of the invention, both the program guide and the information regions are interactive with the user. The interactive information regions may also display information in a static or scrolling manner, and may contain promotional information regarding a current or upcoming program or product advertising information. In addition, if the information region contains advertising information regarding a product, the user may click on the information region to see a billboard or schedule a recording of an infomercial on the product. The interactive program schedule guide and the information regions may further be combined with various other forms of information. Potential sources of additional information include news, sports, and weather. This additional information may either be available on command by the user, or continuously displayed within an area of the program guide. In another preferred embodiment, the information is displayed in a separate information guide.

In yet another preferred embodiment, the program guide is non-interactive, however the information regions containing the advertising and promotional information are interactive and may be either static or scrolling. The user may activate icons or menu items in the information regions or click on the region itself to gain access to additional displays of advertising and promotional information. In this embodiment, the user may switch between full screen display of the guide and a partial or reduced size picture-in-picture (PIP) window display of the guide via, for example, an on screen menu with cursor or pointer control. This feature allows a user to see a large scale version of the guide, or to be able to see the guide through a PIP window while also getting a "flavor" for a currently selected show through a partial observation of the show. Preferably in this mode, the audio for the show also continues to be played.

In preferred embodiments, if an information region is interactive and displays information regarding a program, the user may click on the information region and direct tune to the program if it is currently on. Alternatively, the user may schedule automatic tuning to the program when the program comes on. If the user schedules an "autotune," the system may request confirmation from the user just prior to, or at the time of the scheduled tuning of the program. Alternatively, the system may tune to the program directly. If the program is a pay-per-view program, the system may authorize payment for the program automatically. Preferably, the system will request user confirmation before tuning to or authorizing payment of the program. In addition, the user may choose to record a current program or record a future program. To do this, the user would highlight the program desired on the information region, then choose the record option, and the system would record a current program or asks if it should schedule recording of a future program.

In another preferred embodiment, the advertising or promotional information may appear only during times when the user is more likely to actually be watching the program schedule guide. The guide may further contain commercial icons that allow a user to get more information about the product or service advertised. In addition, the information displayed may change as the user moves the cursor from cell to cell in the program guide. Alternatively, the information displayed in the information regions may change after the passage of a predetermined number of seconds, regardless of user activity. Additional information regions may be displayed while the user confirms that he/she desires to autotune to an upcoming program. These information regions may contain advertising for products, programs, or services and may be displayed until the user makes his/her confirmation.

A further understanding of the nature and advantages of the present invention may be realized by reference to the remaining portions of the specification and the drawings.

BRIEF DESCRIPTION OF THE DRAWINGS

FIG. 9(a) is an illustration of an embodiment of the information guide;

FIG. 10(b) is an illustration of a sports submenu;

FIG. 10(c) is an illustration of a sports information screen;

FIG. 11(b) is an illustration of a weather submenu;

FIG. 11(c) is an illustration of a weather information screen;

DESCRIPTION OF THE PREFERRED EMBODIMENT

Figure 1:
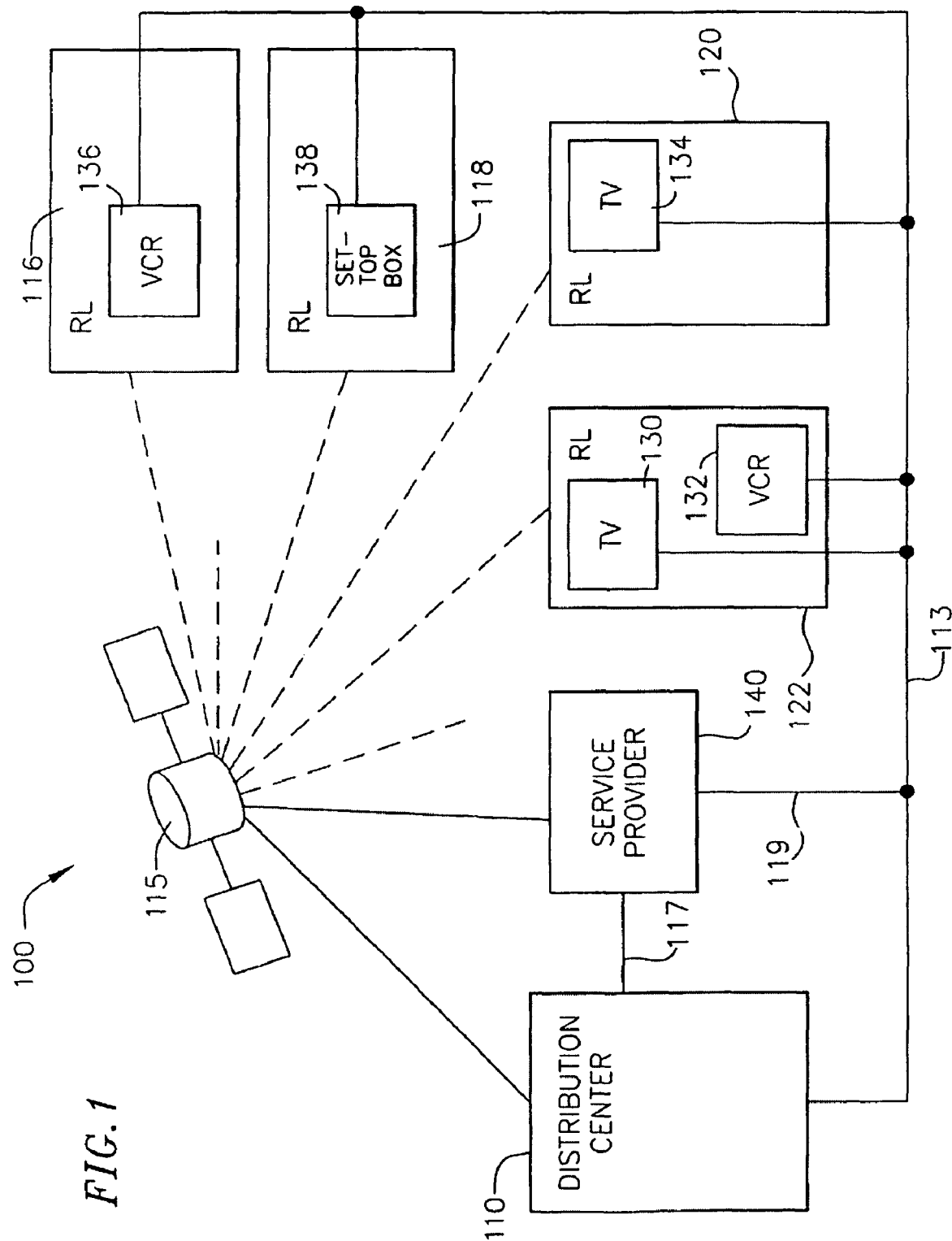
FIG. 1 illustrates a preferred embodiment of a system on which a program schedule guide according to the present invention may be displayed.

The present invention provides a schedule system which contains information regions for displaying other than television program schedule information. FIG. 1 illustrates a preferred embodiment of television/computer system 100 that displays a program schedule guide according to the present invention. As shown, system 100 includes a distribution center 110 and multiple receiving locations. Distribution center 110 compiles data for a data-stream. In a preferred embodiment, this data-stream is broadcast to receiving locations 116, 118, 120, and 122; and peripheral devices that are located within the receiving locations receive the data-stream. Several methods are available for broadcasting the data-stream from distribution center 110 to receiving locations 116-122. For example, satellite 115 may broadcast this data-stream within the vertical blanking interval (VBI) of a television channel (e.g., PBS) or a dedicated channel to receiving locations 116, 118, 120, and 122. Alternatively, the data may also be broadcast out of band, i.e., using non channel specific mechanisms. In another preferred embodiment, the data-stream is provided to receiving locations 116, 118, 120, and 122 via transmission system 113. Transmission system 113 may be, for example, optical fiber, coax cable, telephone line, over the air television broadcast, or the like.

In yet another embodiment, the peripheral devices receive the data-stream from, for example, a local service provider 140. Service provider 140 receives the data-stream from distribution center 110 via line 117, and broadcasts the data-stream to the receiving peripheral devices via satellite 115 (or another satellite), or via lines 119 and 113. The receiving peripheral devices may be televisions 130, televisions 134, VCRs 132, VCRs 136, and/or cable, satellite IRD, web-browser or set-top boxes 138. In still further embodiments, PCTVs or personal computers may be utilized, or the data-stream may be provided to a personal computer for use with the computer and/or one or more of the above devices. Hence, the system is not dependent on hardware platforms, rather it may be a software application that may be downloaded to different systems.

In a preferred embodiment, information in the data-stream includes television schedule information, advertising information, news information, weather information, financial information, internet address linking information, and the like. The information in the data-stream may further include messages from the system operator to a specific user or to subscribers of the system in general. Software applications, which may be downloaded from the distribution center or located within the peripheral devices, utilize the schedule information provided in the data-stream to generate a schedule guide. The news, weather, financial, and other information may be included in the schedule guide, or a separate information guide may be generated. Advertising information and messages from the system operator to a user arc included on the schedule guide, and may be included on the information guide as well. In yet another preferred embodiment, data in the front and back end of the data-stream may be compressed to send a tickler instead of a regular full screen video display. The tickler would be a PIP window, and because the window size is small, the quality of the picture is sufficient even though it is generated from compressed data.

If the software applications are located within the peripheral devices, they may be stored on a computer-readable storage medium such as a RAM, disk, or other storage device. Where applicable, the computer-readable storage medium may also be a ROM. If the schedule guide is in a grid format, for example, the available channels may be listed on the "y" axis and various times may be listed on the "x" axis. For more information on how the schedule system displays information, see U.S. Pat. No. B1 4,706,121, U.S. Pat. No. 5,479,266, and U.S. Pat. No. 5,479,268. These patents, like the present patent application, are assigned to StarSight Telecast, Inc., and are hereby incorporated by reference in their entirety for all purposes.

In another preferred embodiment, satellite 115 has processing capability. Hence, in addition to distribution center 110, satellite 115 may also compile data for the data-stream. This embodiment is very advantageous as it ensures continued and reliable data transmission in situations where satellite 115 may not be able to receive data from distribution center 110. An example of such situations is during periods of atmospheric or terrestrial interferences, which occur when satellite 115 is in-line with distribution center 110 and the Sun. The Sun, having immense energy, emits a lot of noise thereby interfering data transmission from distribution center 110 to satellite 115. With its own data processor, satellite 115 may continue to transmit data, hence, ensuring continued and reliable data transfer to the receiving locations. This embodiment also ensures continued and reliable data transmission when distribution center 110 is out of service.

Figure 2A:
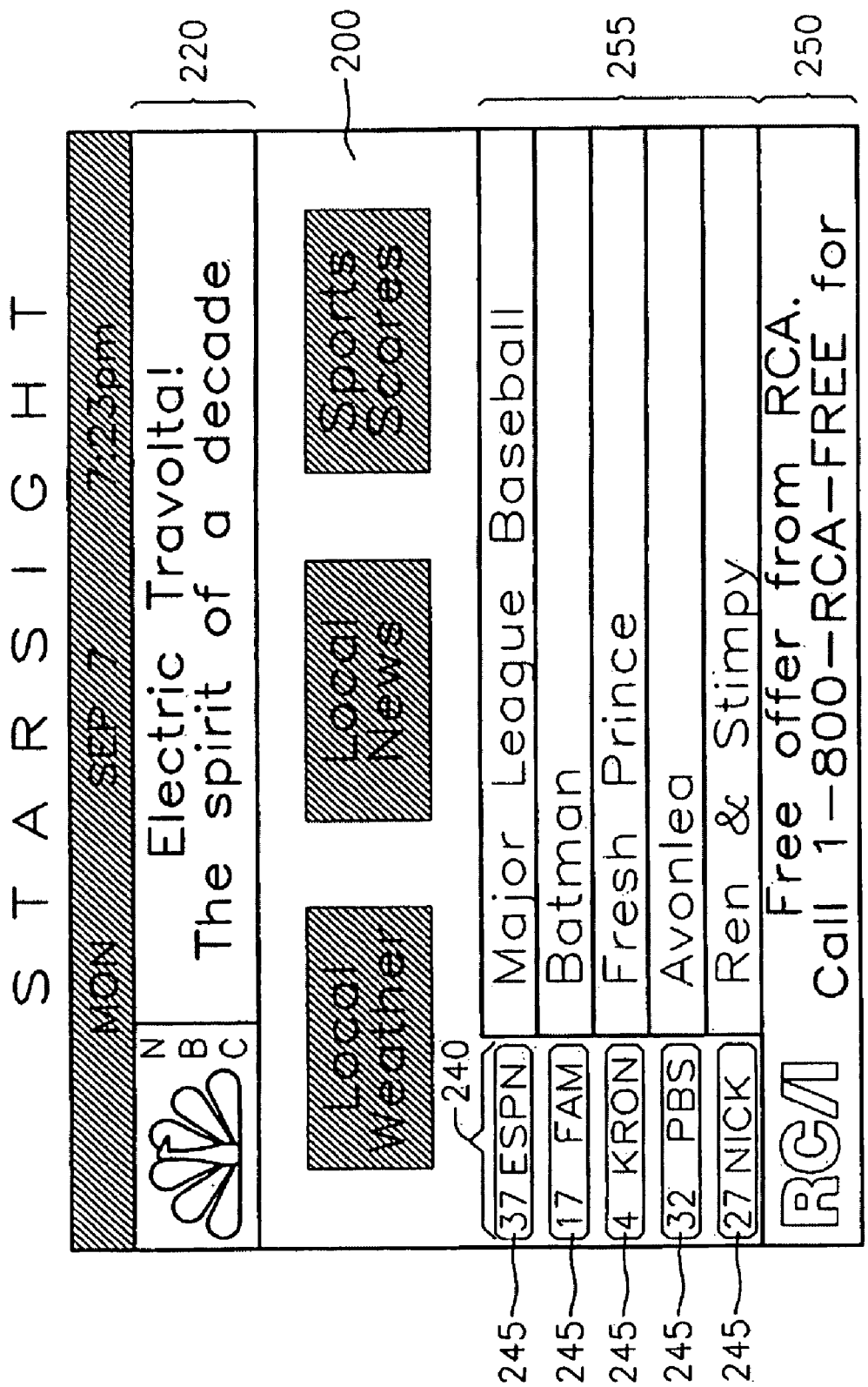
FIG. 2(a) is an illustration of a program schedule guide screen according to the present invention with program information, information icons, and information regions.
Figure 2B:
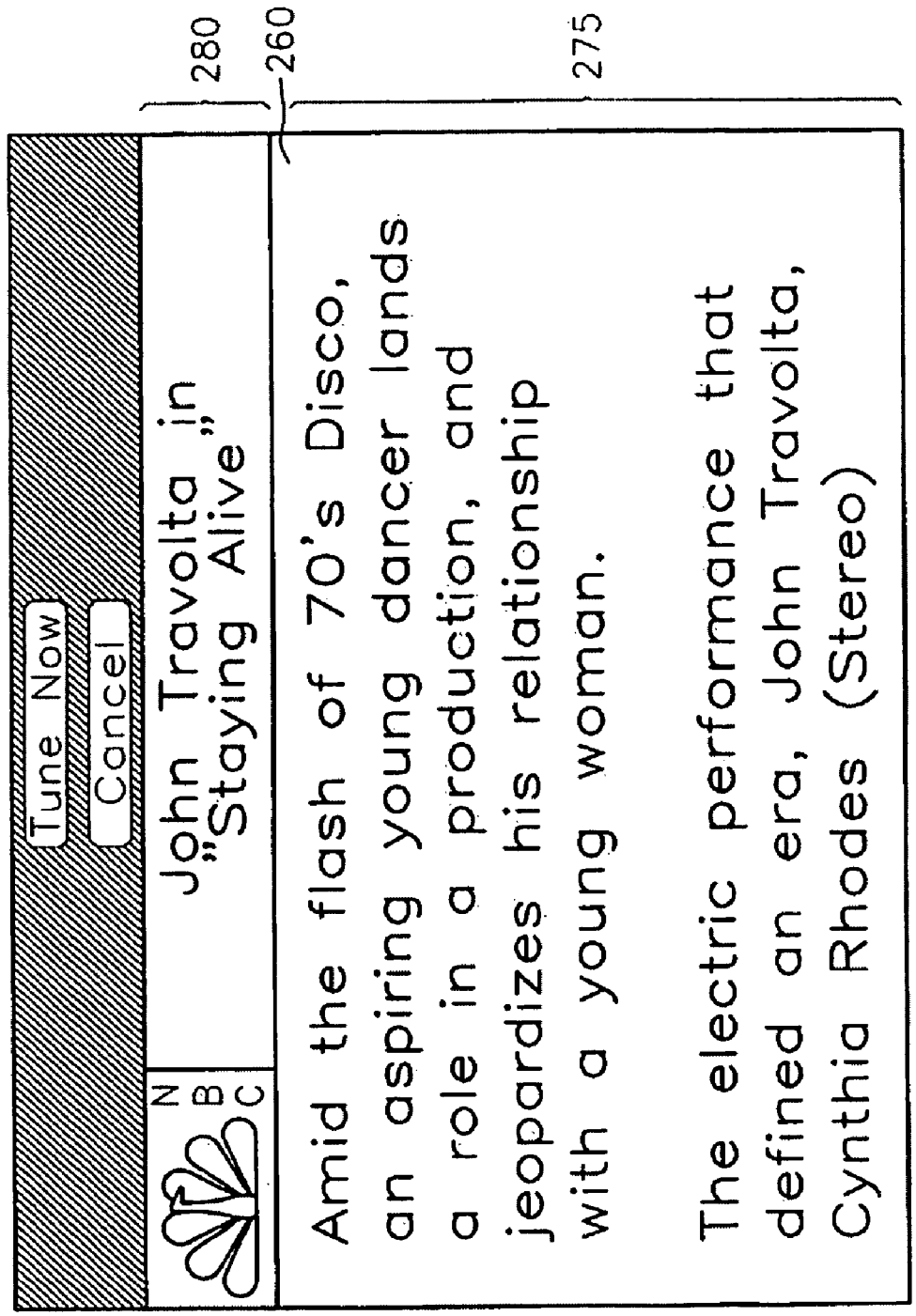
FIG. 2(b) is an illustration of a promotional message screen shown to the user when the user selects the information region of FIG. 2(a)

FIG. 2 is an illustration of a program schedule guide screen according to the present invention. As illustrated, program guide screen 200 has program information, information regions for offering product and program information, and information icons for offering information such as sports, news and the like. FIG. 2 shows only two information regions, 220 and 250, although guide screen 200 may have multiple information regions. As shown in FIG. 2, cell 220 shows a promotion for NBC's program featuring Travolta. Program guide screen 200 also contains an advertisement space 250. This space can be used to provide additional advertising opportunities, an example is advertisements for a system operator. Preferably the space is used for short advertisements that change periodically, for example, on three minute intervals. An example of a suitable advertisement is "Enjoy Coke!". Here cell 250 shows an advertisement from RCA. In another embodiment the information displayed in the information regions may change as the user moves from celt to cell in the program guide. Alternatively, the information may change automatically after the passage of a predetermined number of seconds, regardless of user activity. In addition or as an alternative, there may be commercial icons to allow the user to get more information about the product or service advertised.

Information regions 220 and 250 may be color coded or otherwise visually distinguished. They may also be placed at strategic positions within the guide to better catch the user's attention. As described, when an information region contains program information, such as cell 220, the user may move the cursor to the region (or the cursor may point to the region by default) and tune to the program if it is currently on. If the program is not currently on, the user may schedule an autotune to the program when the program airs. The user may further record a current program or schedule a recording of a future program. When an information region contains product information, such as cell 250, the user may click on the information region to tune to an infomercial on the product. Alternatively, the user may schedule an autotune to the infomercial at a later time period, or schedule a recording of the infomercial on the product. In a two way system, which has a back-channel for transmitting information or requests from the user, the user may also order a product by clicking on an information region and providing the necessary customer information for transmission to a supplier of the product, or to the system operator (service provider).

Portion 240 of guide screen 200 contains cells 245. Each cell 245 indicates the channel number corresponding to the program guide cell 255 lying immediately adjacent to it in the program guide. Instead of, or in combination with the channel number, cells 245 may contain the program service name. For example, a cell 245 may contain the channel number 32, the service name PBS, or both.

The system operator may charge television program providers an additional fee, per time slot, for promoting and featuring programs in the information regions. In this manner, the system operator may provide the guide to a user at a reduced price while providing more information. A number of different display arrangements can be used to draw the user's attention to such "special" programs. For example, the program may be listed First in the program guide, shown in a different typeface, presented in a different color, given additional space for a program description, or have some other form of graphic enhancement, including animation.

FIG. 2(*b*) is an illustration of a promotional message screen 260. Screen 260 is shown to the user when information region 220 is interactive, and the user clicks on information region 220. Promotional screen 260 may also contain an icon to allow immediate tuning to the program described by the promotional message. In addition, promotional screen 260 may contain another icon that returns the user to guide 200. Since the system operator may charge a fee for displaying such promotional information, some or all of a message portion 275 may also be used as an additional revenue source.

In FIG. 2(*b*), portion 275 contains the promotion: "Amid the flash of 70's Disco, an aspiring young dancer . . . ." This promotional material, which in this example would typically be provided by NBC, provides the user with several benefits. First, it allows a program to be promoted which is not currently represented in the program schedule guide. Second, portion 275 may be used to provide further information about a specific program, such as the starring actors or a brief description of the program content, thus possibly gaining a larger viewing audience or market share. Third, by promoting a program through prominent featuring of the program in the program guide, the broadcaster may be able to prevent potential viewers from becoming engrossed in a program which is to continue after the start time of the promoted program.

Portion 280 of screen 260 is used to indicate the sponsor of the promotional message shown in portion 275. The sponsor indication can be by broadcaster call letters, channel number, broadcaster name, or broadcaster insignia (e.g., the NBC peacock). It is also possible to eliminate portion 280, thereby enlarging portion 275. Additional information may therefore be displayed in portion 275. Since portion 280 of screen 260 displays information regarding a program, the user may click on the information region and direct tune to the program if it is currently on. Alternatively, the user may schedule automatic tuning to the program when the program comes on. If the user schedules an autotune, the system may request confirmation from the user before tuning to the program, or the system may tune to the program directly. Preferably, the system will request user confirmation before tuning to the program. If user confirmation is requested, additional information regions may be displayed until the user makes his confirmation. These information regions may include advertising for products or services.

If the promoted program is a pay-per-view program, the system may authorize payment for the program automatically. Preferably, the system will request user confirmation before authorizing payment of the program. The user may further choose to record the promoted program, whether it is a current program, a future program, or a pay-per-view program. If the user requests recording of a pay-per-view program, the system may ask for confirmation before authorizing payment for the program. If the user requests recording of a future program, the system may also request user confirmation. Additional information regions may also be displayed while the user confirms his/her recording request.

If an information region displays advertising or promotional material, the user may activate an icon, click on the region, or select a menu item to view additional information about the product or service advertised. From these additional information displays, the user may learn more about the product or service, order the product or service, or find out where the product or service may be obtained. The additional displays would of course allow the user to return to the previous displays after the user has seen the desired information displays.

The invention may also allow the user to switch between full screen display and a PIP window display of the guide via, for example, an on screen menu with cursor control. This feature would allow a user to see a large scale version of the guide, or to be able to see the guide while also getting a "flavor" for a currently selected show through only partial observation of the show. Preferably in this mode, the audio for the show also continues to be played.

Figure 3A:
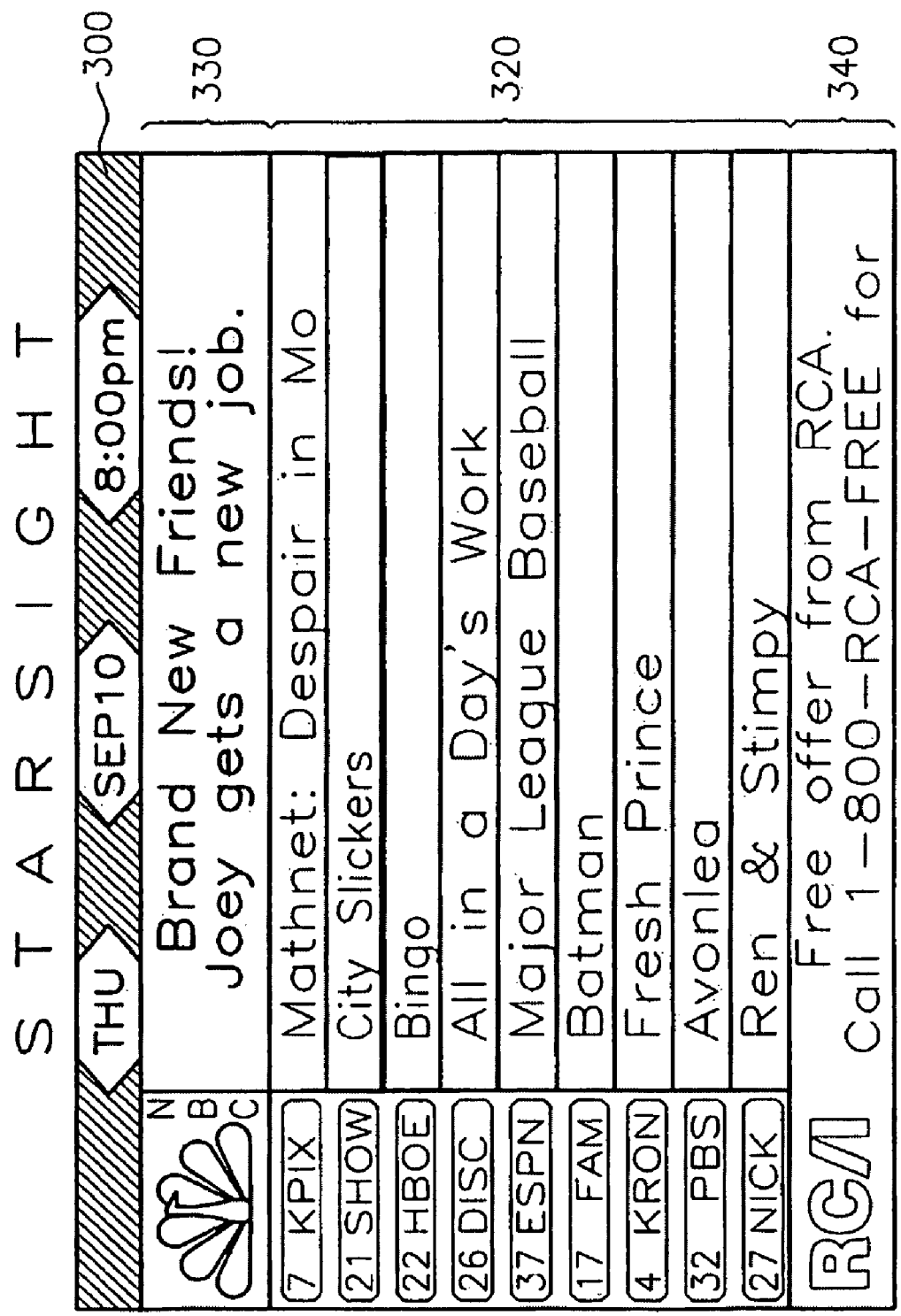
FIG. 3(a) is an illustration of a program schedule guide screen according to the present invention with program information, and information regions.
Figure 3B:
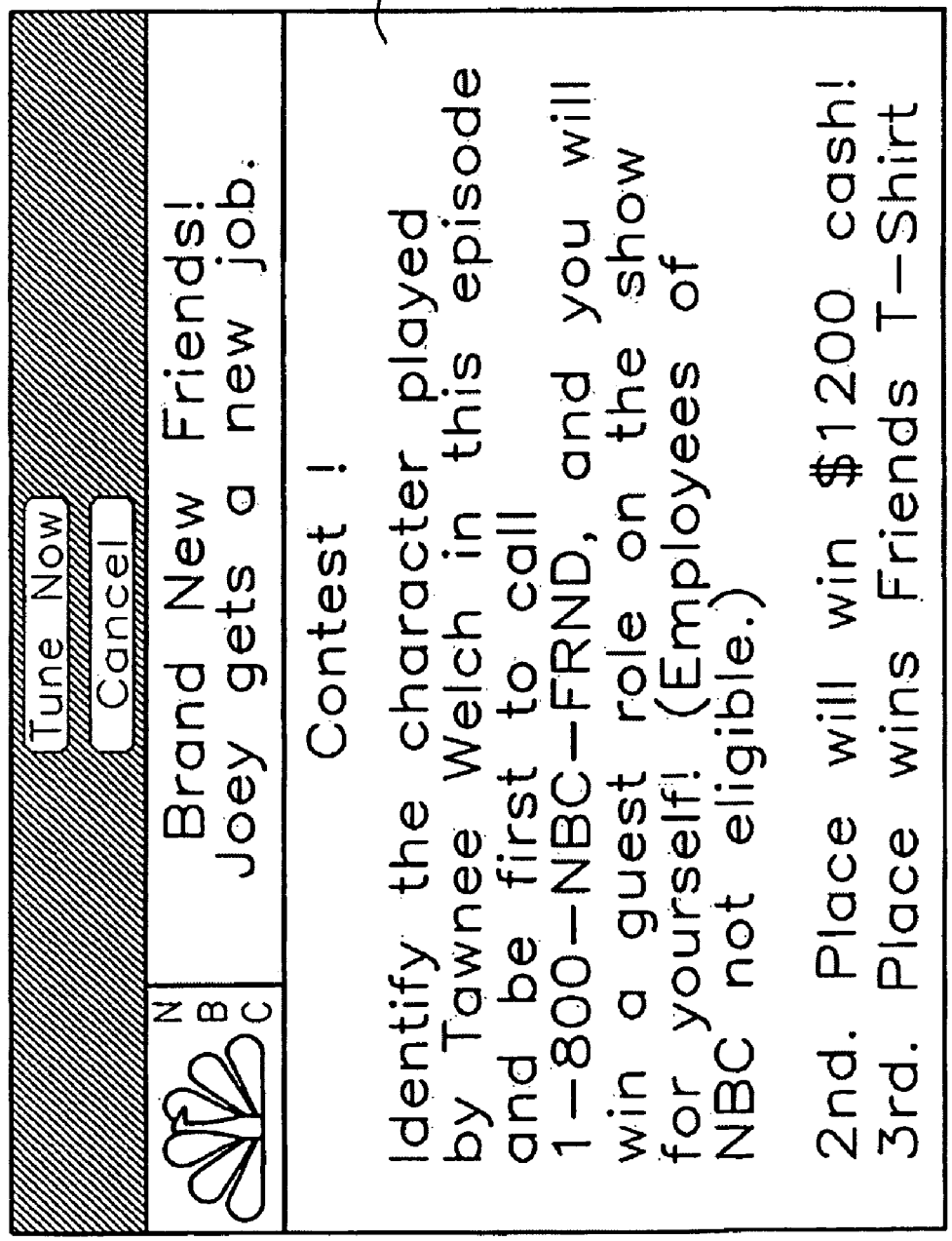
FIG. 3(b) is an illustration of a promotional message screen shown to the user when the user selects the information region of FIG. 3(a)

FIG. 3(a) is an illustration of a program schedule guide screen 300 with program information 320 and interactive information regions 330 and 340. As can be seen, guide screen 300 does not contain information icons. Hence, more schedule information may be shown on the screen, thereby allowing the user to access more schedule information per screen. Information region 320, like information region 220, promotes a program. In addition, it provides a brief description of the program content, thereby allowing information other than program description to be shown on promotional message screen 350 (FIG. 3(b)). As shown by FIG. 3(b), message screen 350 contains contest information, however other information related to the program may also be shown on screen 350.

Figure 4A:
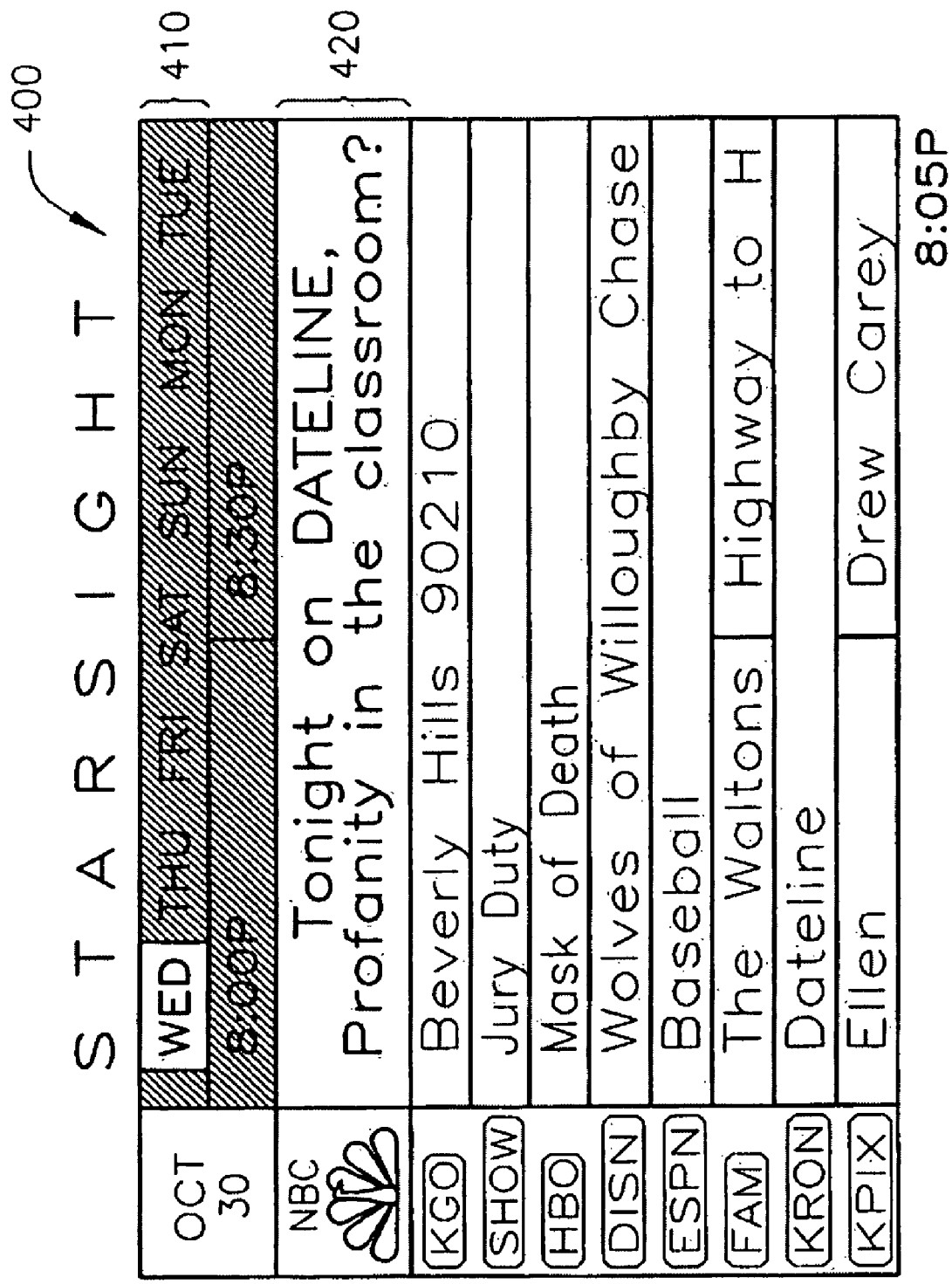
FIG. 4(a) is an illustration of an alternate embodiment of the program schedule guide screen according to the present invention with program information and an information region.

FIG. 4(a) is an illustration of a program schedule guide screen 400. As shown, the user may move a cursor across region 410 to move between the different days of the week. In FIG. 4(a), the user has selected Wednesday. Hence, the schedule information displayed is for Wednesday, and the time shown is the current time. The system knows what time the user is watching television, and automatically adjusts the cursor to be located on default on a cell that corresponds to the current time.

Figure 4B:
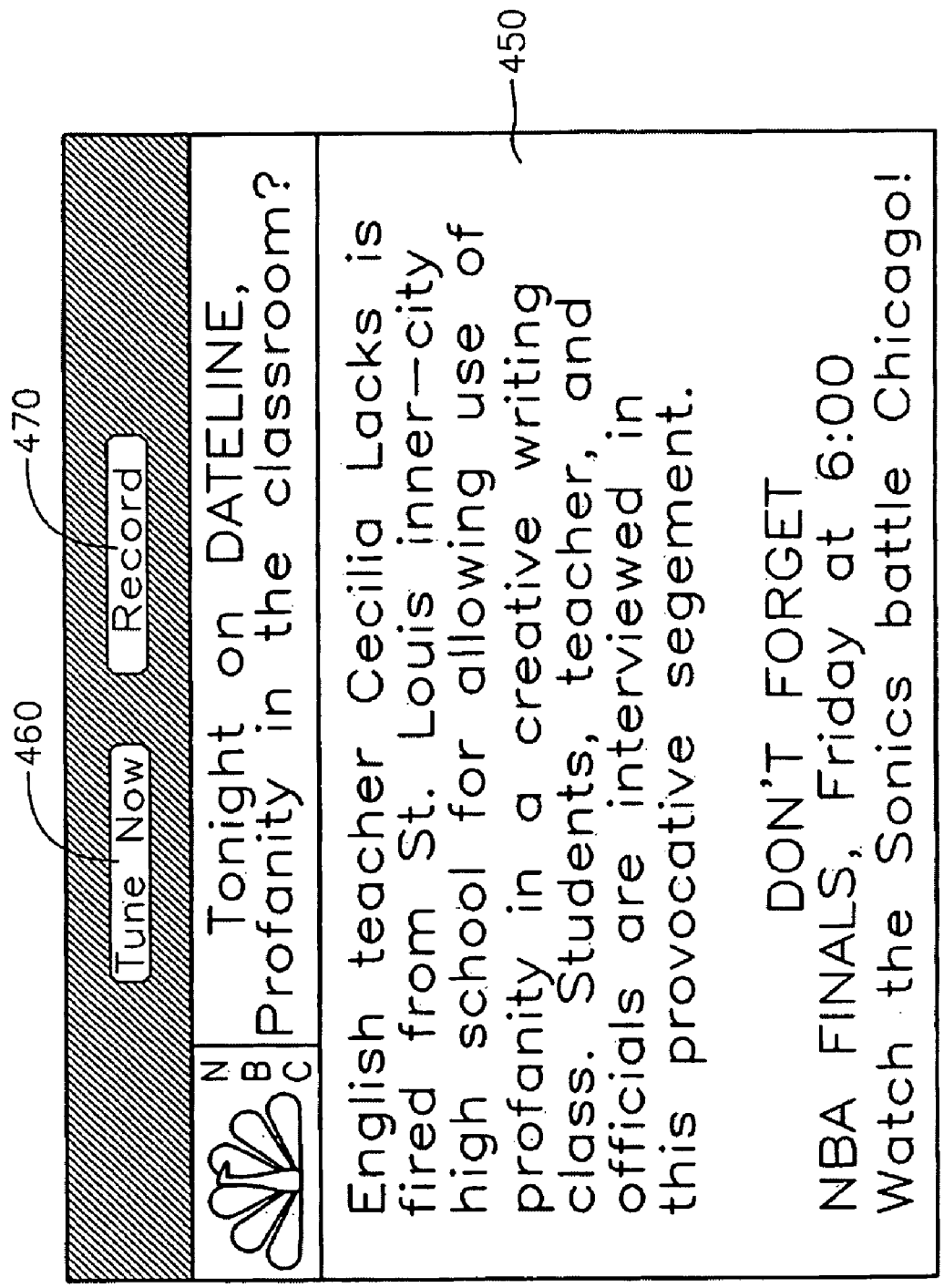
FIG. 4(b) is an illustration of a promotional message screen shown to the user when the user selects the information region of FIG. 4(a)

As shown, guide screen 400 has one information region 420, which is promoting a program that may be on shortly or is currently on. Information region 420 is interactive. Hence, if the user clicks on region 420, the user may see message screen 450 (FIG. 4(b)), which displays a description of the program content. In addition, message screen 450 may also display promotional materials about an upcoming program. This way, the system operator may indirectly promote multiple programs on region 420. If the program is currently on, the user may click on icon 460 to tune to the program. If the program will come on shortly, the user will be tuned to the channel that corresponds to the program. Alternatively, the user may click on icon 470 to start recording the program if the program is on. On occasions where the program will come on shortly, the system will start recording the program when the program comes on.

Figure 5A:
FIG. 5(a) is an illustration of an alternate embodiment of the program schedule guide screen according to the present invention with program information and an information region.
Figure 5B:
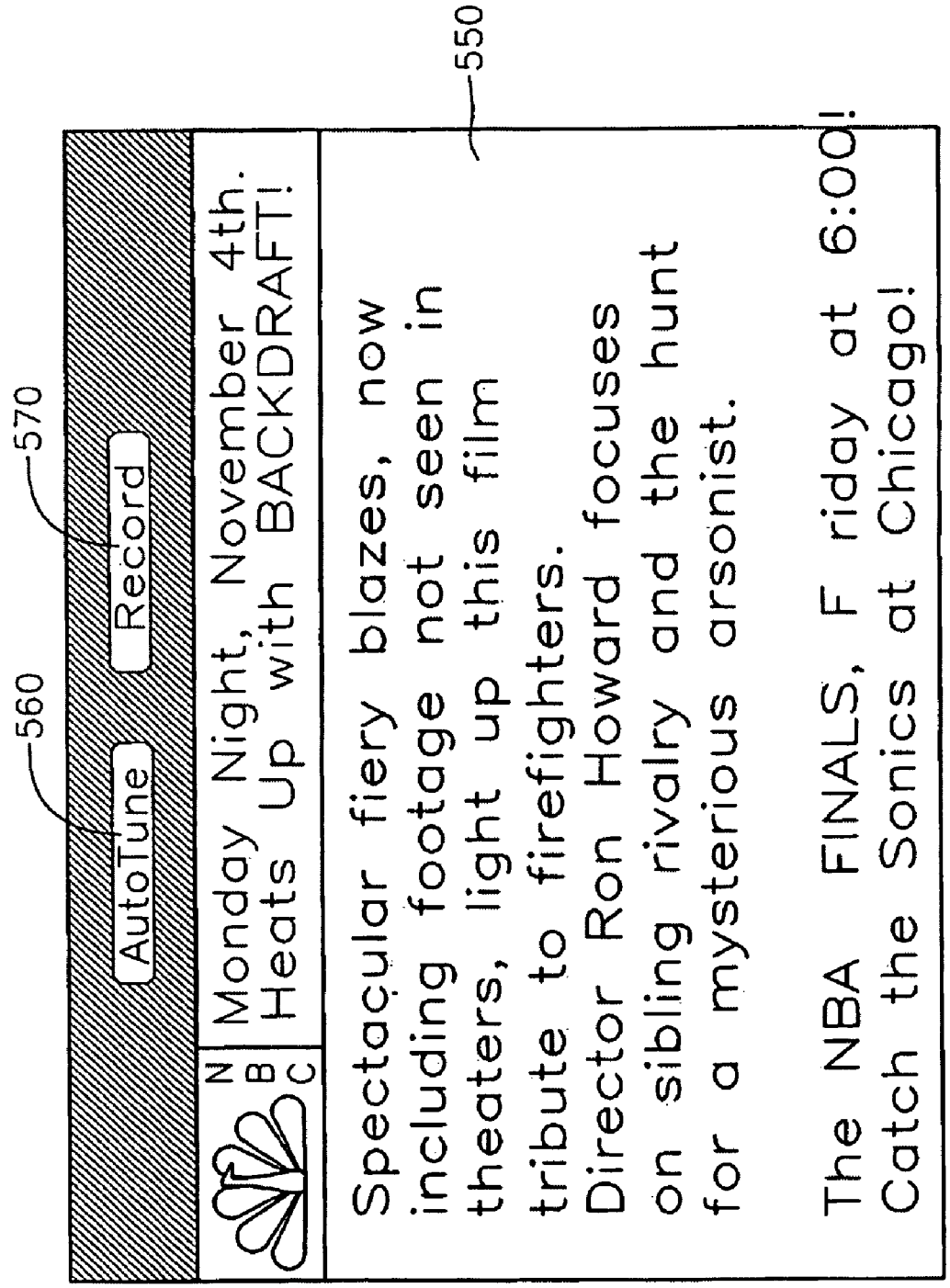
FIG. 5(b) is an illustration of a promotional message screen shown to the user when the user selects the information region of FIG. 5(a)

FIG. 5(a) is an illustration of a program schedule guide screen 500. As shown, guide screen 500 has one information region 520, which is interactive. Information region 520 is promoting a program that will air in the future. In this case, if the user clicks on region 520, the user may see message screen 550 (FIG. 5(b)), which also displays a description of the program content. In another embodiment, message screen 550 may also contain an icon, which the user may click on to view a short video preview. This preview may be shown in a PIP window, and the preview video data may be transmitted in a compressed format. As mentioned, the size of the window allows a decent video display to be generated from compressed data. Message screen 550 also displays promotional materials about an upcoming program. However, because the program will not air until a later date, message screen 550 has icon 560, which when clicked on by the user, will allow the user to schedule an autotune to the program when the program comes on. Once the user has scheduled an autotune, the system will automatically tune to the program when the program airs. Preferably, user confirmation is requested before the system tunes to the program. Alternatively, the user may click on icon 570 to schedule a recording of the program. The system will automatically start recording the program when the program comes on.

In another embodiment, the system may automatically tulle a user to a promoted program when the program comes on. This may happen whether or not the user has scheduled an autotune to the program. Preferably, the system will ask the user whether the user wishes to tune to the program before automatically tuning to the program.

The interactive and non-interactive information screens may both be used for displaying scrolling messages or static messages. As discussed, these information screens may be used to promote programs as well as products. In addition, the information screens may also be used to send messages to specific users, for example, alerting a user that his/her bill is overdue. This is because each guide system has a unique Unit address. Hence, the system operator is able to send messages to specific users by sending the messages to the respective unit addresses. Of course, the information screens may be used to send system wide messages to all users. For example, the information screens may be used to send alerts to all users, for example, of an impending disaster. The information screens may further be used to send messages to a specific group of users. For example, the system could send a message to all Magnavox television owners by checking for Magnavox television codes as this information is entered into the system when the user first sets up the system. To ensure that messages to the users are read by the users, such messages will have a bit attached to them that keeps them in the information screen until the user indicates that he/she has seen the message. The user may indicate that he/she has seen the message by pushing a button on a user input device or by clicking on an icon on the guide to clear the message. This way, even though the message may be placed by the system operator in the morning, the user may still see the message when the user watches television at Prime Time. After the message is cleared, the system will place advertisements or promotions appropriate for the time when the message is cleared in the information screen.

Figure 6A:
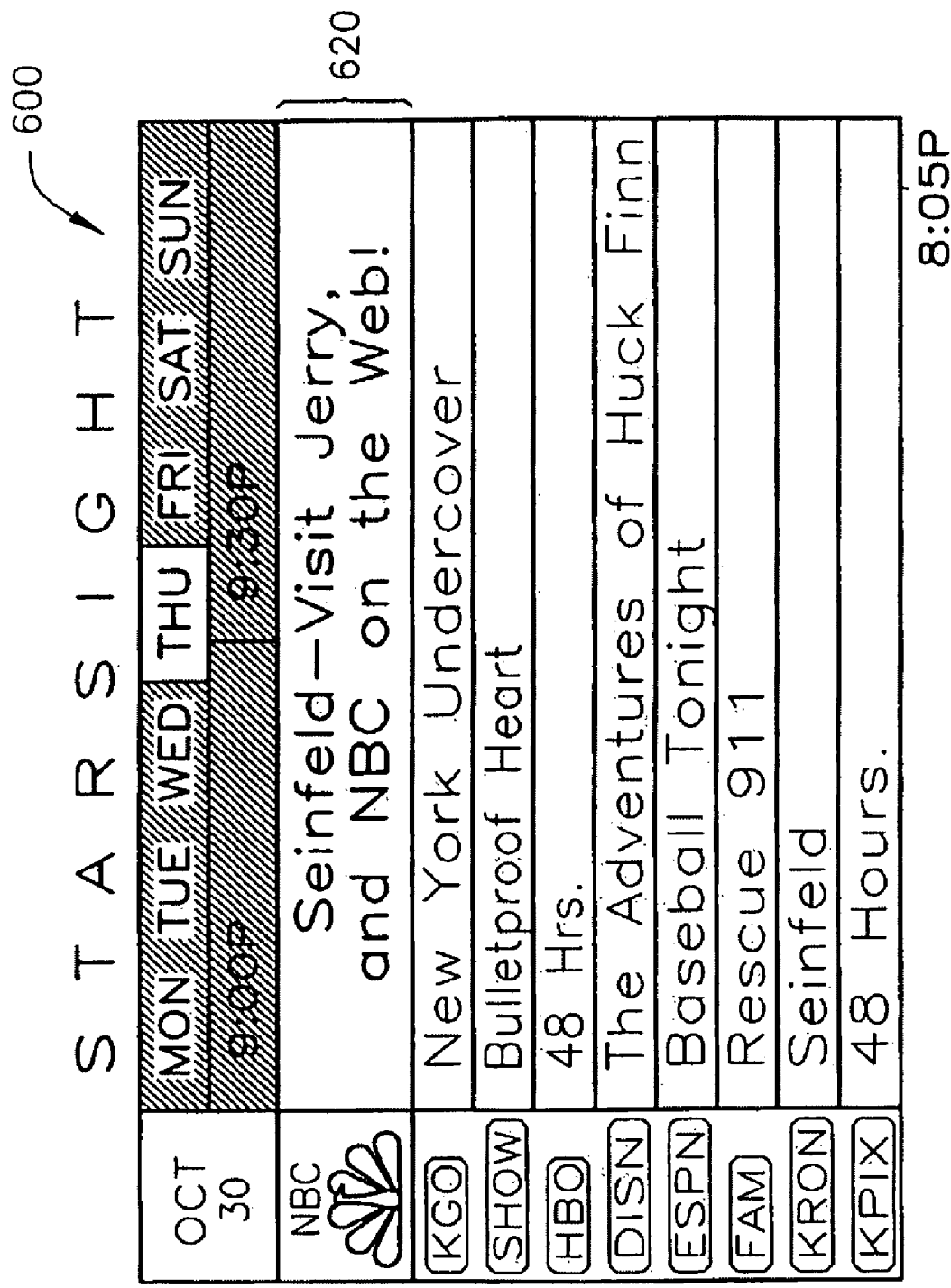
FIG. 6(a) is an illustration of an alternate embodiment of the program schedule guide screen according to the present invention with program information and an information region.
Figure 6B:
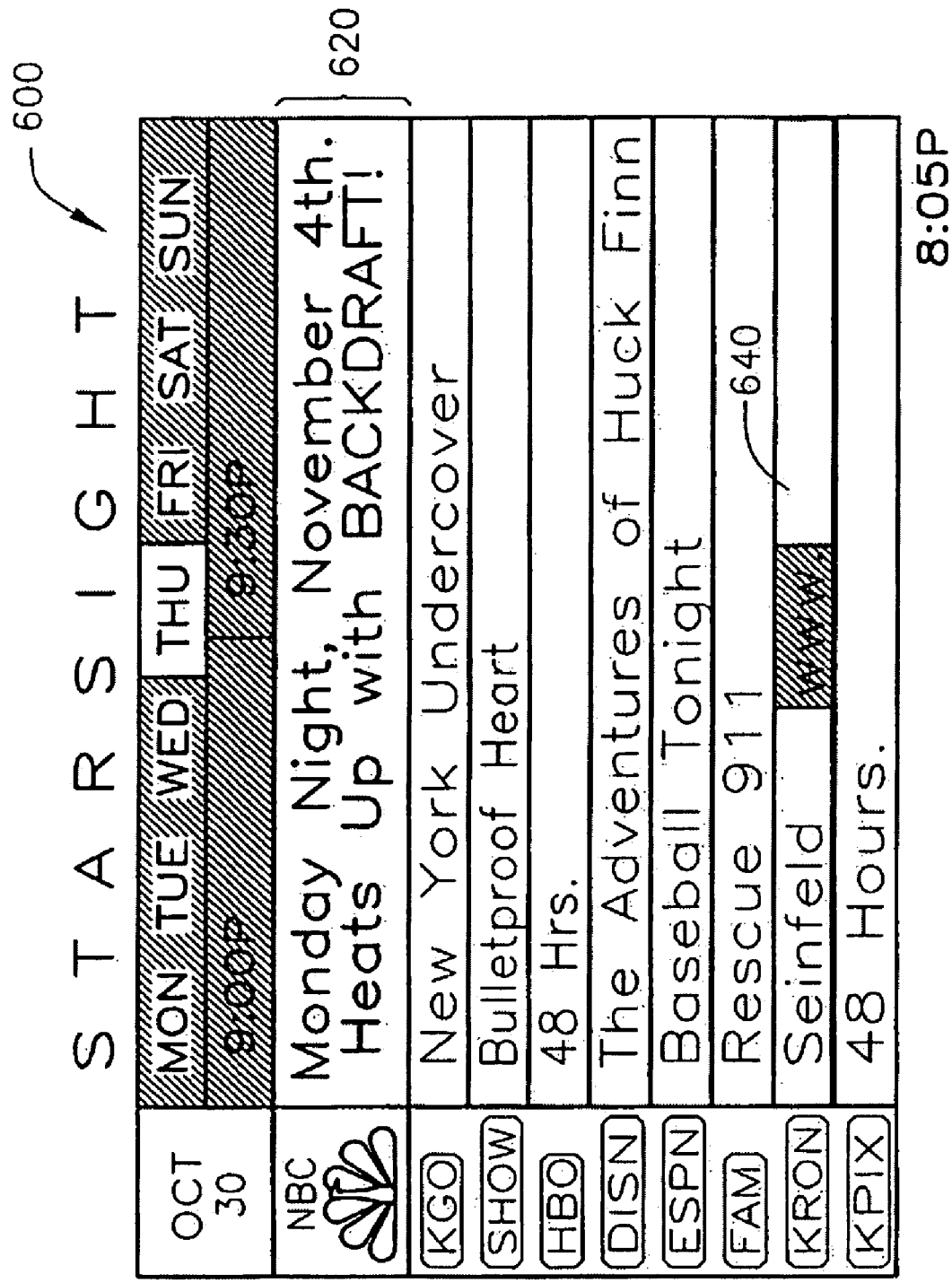
FIG. 6(b) is an illustration of an alternate embodiment of the program schedule guide screen which includes virtual channels.

FIG. 6(a) is an illustration of a program schedule guide screen 600. As shown, guide screen 600 has an interactive information region 620, which promotes a website connected with a program. In an alternate embodiment (FIG. 6(b)), guide screen 600 may include a virtual channel 640. A virtual channel is a channel that does not tune to television programs; instead, the channel may launch an application, connect to an internet site, connect to a information guide, and the like. In the example as shown in FIG. 6(b), virtual channel 640 contains an internet address—also called a Uniform Resource Locator (URL); hence it connects to an internet site. As shown in FIG. 6(b), region 620 may be used to display promotional materials in this alternate embodiment. If a user selects visual channel 640 of FIG. 6(b), or information region 620 of FIG. 6(a), the user may see submenu screen 650 of FIG. 6(c).

Figure 6C:
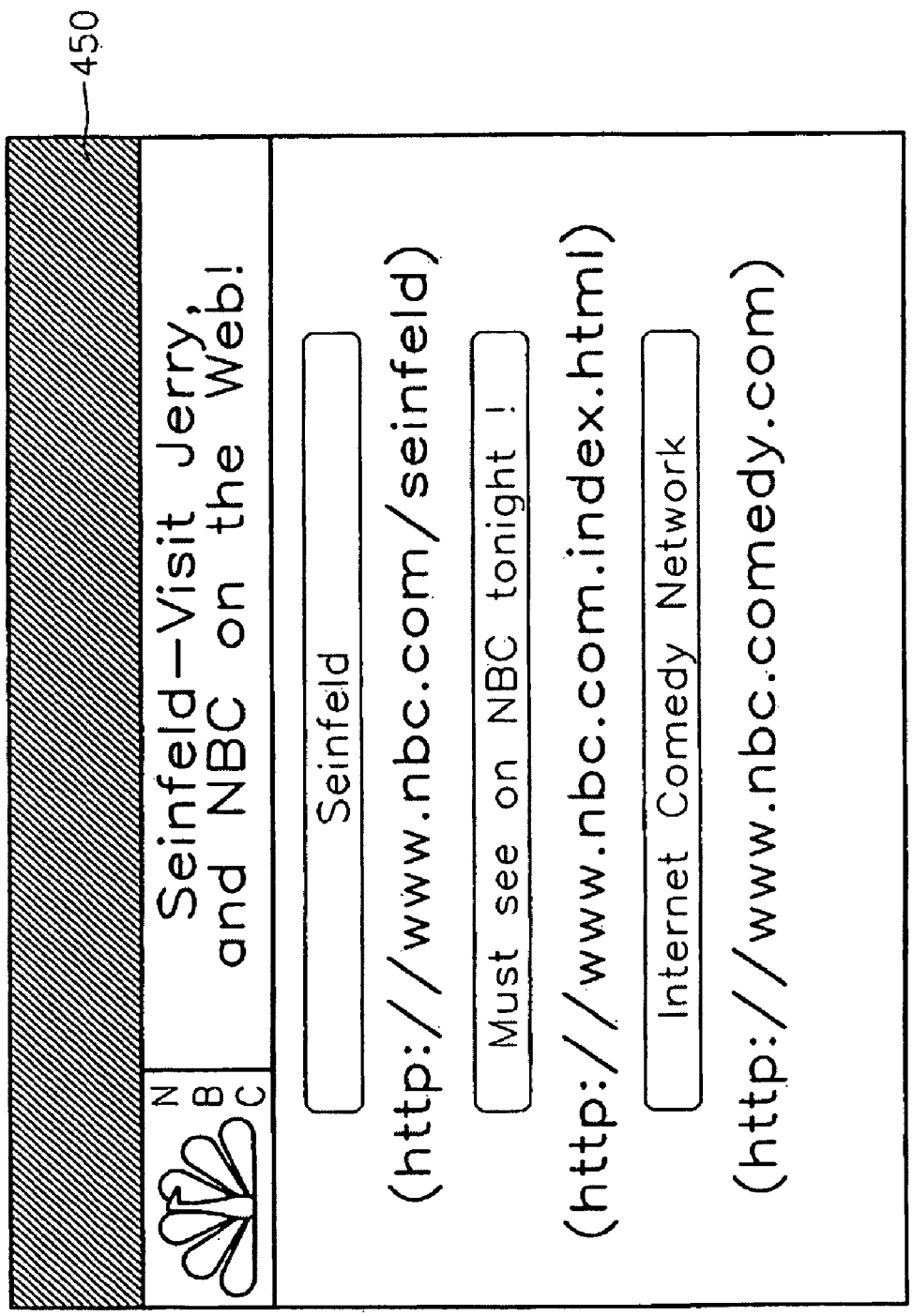
FIG. 6(c) is an illustration of a submenu screen shown to the user when the user selects the information region of FIG. 6(a) or the virtual channel of FIG. 6(b)
Figure 6D:
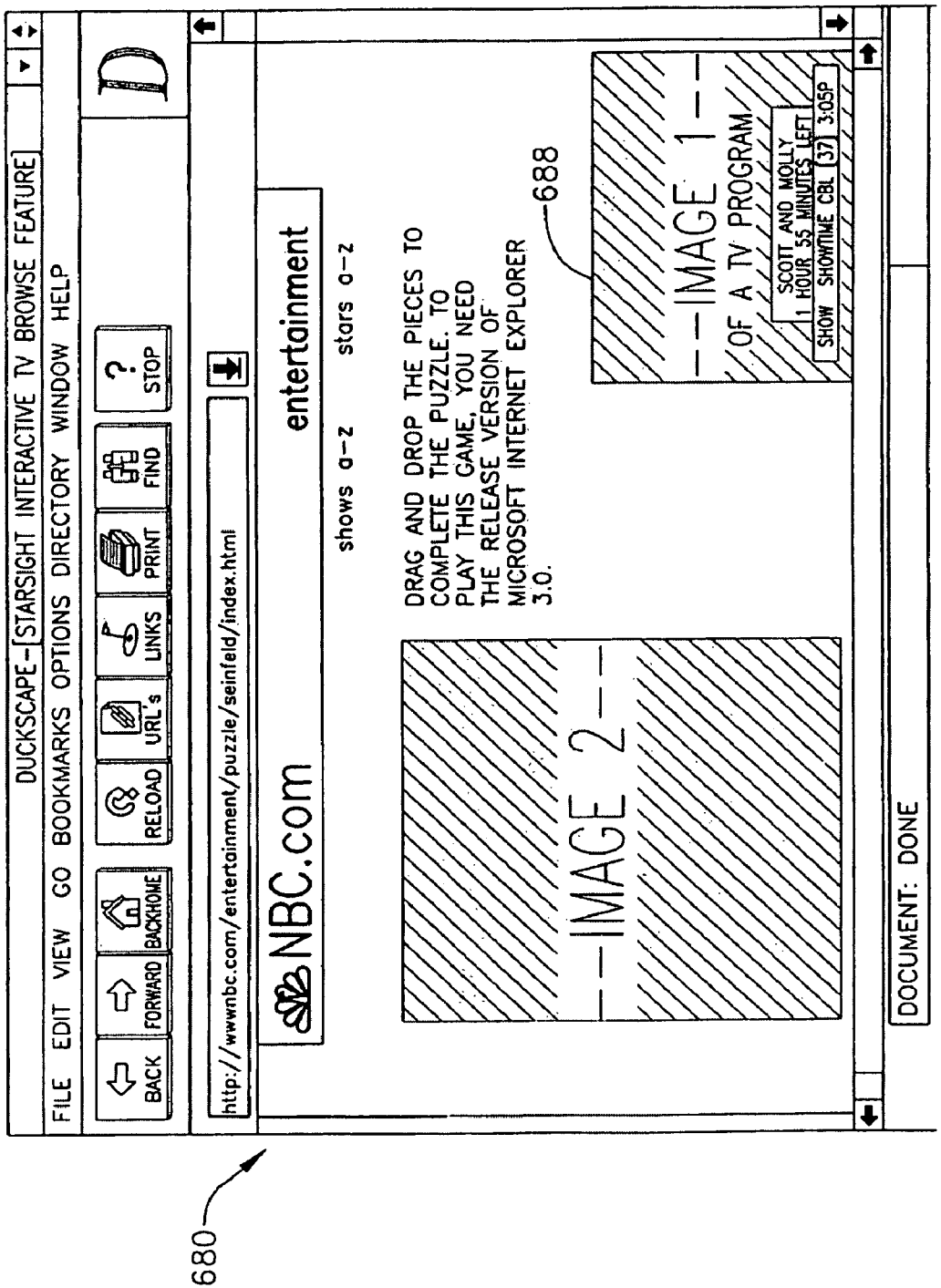
FIG. 6(d) is an illustration of a data page shown to the user when the user selects one of the options shown in the submenu screen of FIG. 6(c)

As shown in FIG. 6(c), the user may choose to connect to the Seinfeld web page, the NBC web page that promotes the Seinfeld show, or the Comedy Network web page by clicking on one of the three website icons 660, 665, and 669, respectively. The system will launch a web-browser when the user selects an information region that promotes a website, or tunes to a virtual channel containing a URL. After the user has made his/her selection, the system will insert the URL corresponding to the selected website into the web-browser, which will begin to access the web and search for the website selected by the user to connect the user to the website data page. Hence, if the user selects one of the website icons, the system will connect the user to the website that corresponds to the icon. FIG. 6(d) is an illustration of a web page 680 shown to the user when the user chooses to connect to the NBC web page. As shown, after the user is connected to the page, the user may participate in promotions on the page just as if the user had connected to the page directly through a web-browser.

FIG. 6(d) further shows window 688, which shows the television program that the user was viewing before the user selected virtual channel 640 from program guide screen 600 of FIG. 6(b), or clicked on information region 620 of FIG. 6(a). The user may resume watching the television program by clicking on window 688. This is referred as "hypertuning," and the system will return the user to the program the user was viewing. While the user is viewing the program, the system preferably displays a network icon that the user may click on to hypertune to the web page. Alternatively, the system may display the page in a picture-in-picture window such as window 688 while the viewer is viewing a program. The user may click on the picture-in-picture web page to hypertune to the page.

In another preferred embodiment, after the user has selected either icon 660, 665, or 669 of FIG. 6(c), the user may tune to the program the viewer was watching before accessing the guide. The system will display a "searching" symbol while launching a web-browser and searching for the website that the user has requested. After the system has connected to the website, the system will notify the user that the search is complete, and asks whether the user wishes to hypertune to the web page. In yet another preferred embodiment, the user may click on any program titles shown in the program guide cells, and the system will display a list of one or more websites that are related to the program. The user may select to tune to the program or connect to one of the websites. In addition, the user may click on an icon or press a remote control button to toggle between watching television and browsing the web.

Figure 7:
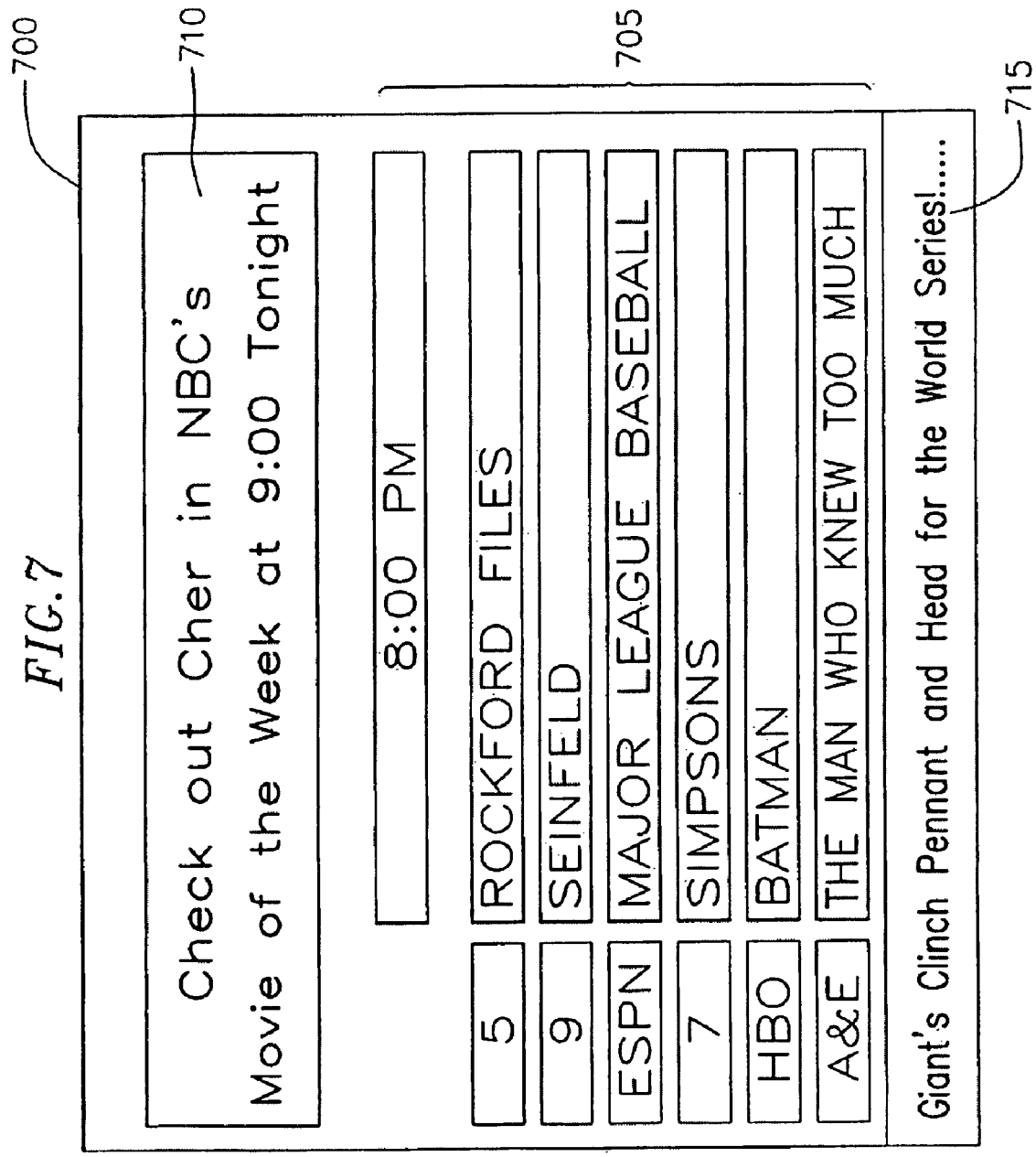
FIG. 7 is an illustration of an alternate embodiment of the program schedule guide which includes information regions.

FIG. 7 is an illustration of a program schedule guide screen 700 with non-interactive program portion 705 and interactive information regions 710 and 715. Portion 705, as shown, is a time slice of schedule information for current programs. Since the user may not interact with portion 705 of guide screen 700, portion 705 may be updated automatically over time to show current and future programs. The amount of future programs shown may be predetermined. Hence, the user may see what is currently on, and what programs will come on up to a predetermined amount of time. However, the user may not obtain more information regarding the programs, tune to the programs from portion 705, or record the programs from portion 705.

As shown in FIG. 7, information region 710 contains program promotional information. Since information region 710 is interactive with the user, the user may click on information region 710 to get further information about the programs shown in the region. The user may further click on information region 710 to tune to the program if it is currently on, or the user may schedule an autotune to the program when it comes on. When autotune is scheduled, the system may or may not notify the user before automatically tuning to the program when the program comes on. Preferably, the system will request confirmation from the user before automatically tuning to the program. Finally, the user may schedule a recording of a future program or begin recording of a program currently on. As discussed, if the system requests confirmation from the user, additional information regions may be displayed while the user confirms his/her request.

Information region 715 may either be a static or scrolling message area that contains selected news or sports information. For example, the latest sports scores can scroll across information region 715. Although in the preferred embodiment, the type of information shown in information region 715 is determined by the system operator, it is also possible to allow the user to select the type of information to be shown in information region 715.

Figure 8:
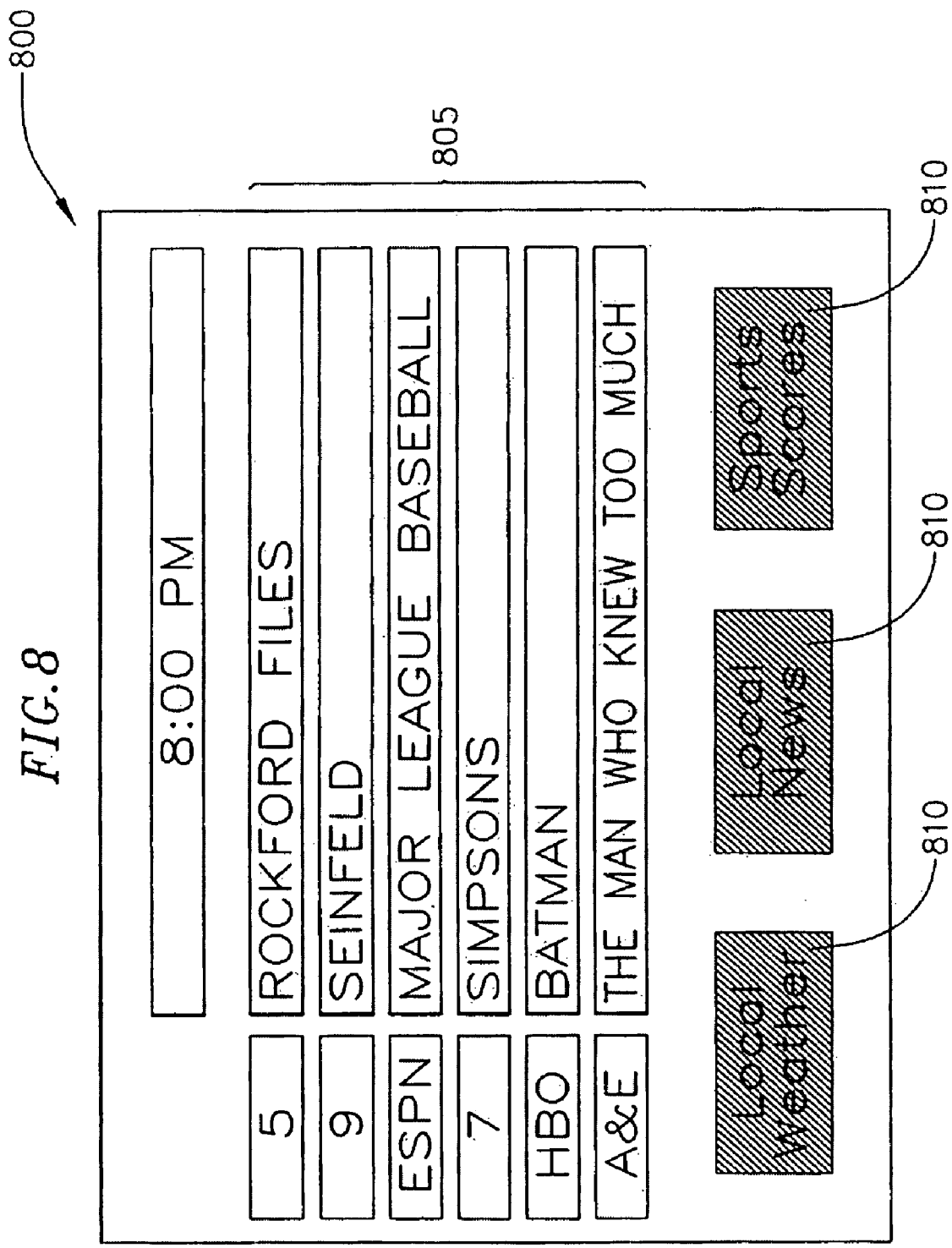
FIG. 8 is an illustration of an alternate embodiment of the program schedule guide screen which includes information icons.

FIG. 8 is an illustration of a program guide screen 800. Screen 800 contains a program schedule portion 805 similar in nature to the schedule guides previously described. In addition, screen 800 contains several information icons 810. Icons 810 can represent local or national weather forecasts, local or national news, sports news, sports scores, financial news, and the like. In response to the user selecting one of icons 810, screen 800 may be replaced with one or more additional information screens. For example, the weather information screen may display the current weather conditions or weather predictions for a plurality of regions. The sports score information screen may have icons or regions to represent each of a plurality of sports. A user may click on the individual icons or regions to view another screen dedicated to a single sport, or the sports score information screen may display the scores for different sports and sports teams on the same screen. The financial news information screen may likewise have icons or regions that the user may click on to choose other screens dedicated to specific financial markets. Alternatively, the financial news information screen may combine and display the financial markets on one screen.

FIG. 9(a) is an illustration of an information guide screen 900. As shown, information guide screen 900 contains news, weather, sports, and horoscope information, however, other types of information may also he shown by information guide screen 900. As discussed, in an alternate embodiment, an information guide may be provided in addition to the program guide. The information guide may be connected to the program guide, or it may be a separate program. Since the information guide contains news, weather, sports, and other information, it may replace the information icons on the program guide, thereby allowing the program guide screen to show the user more program information.

Figure 9B:
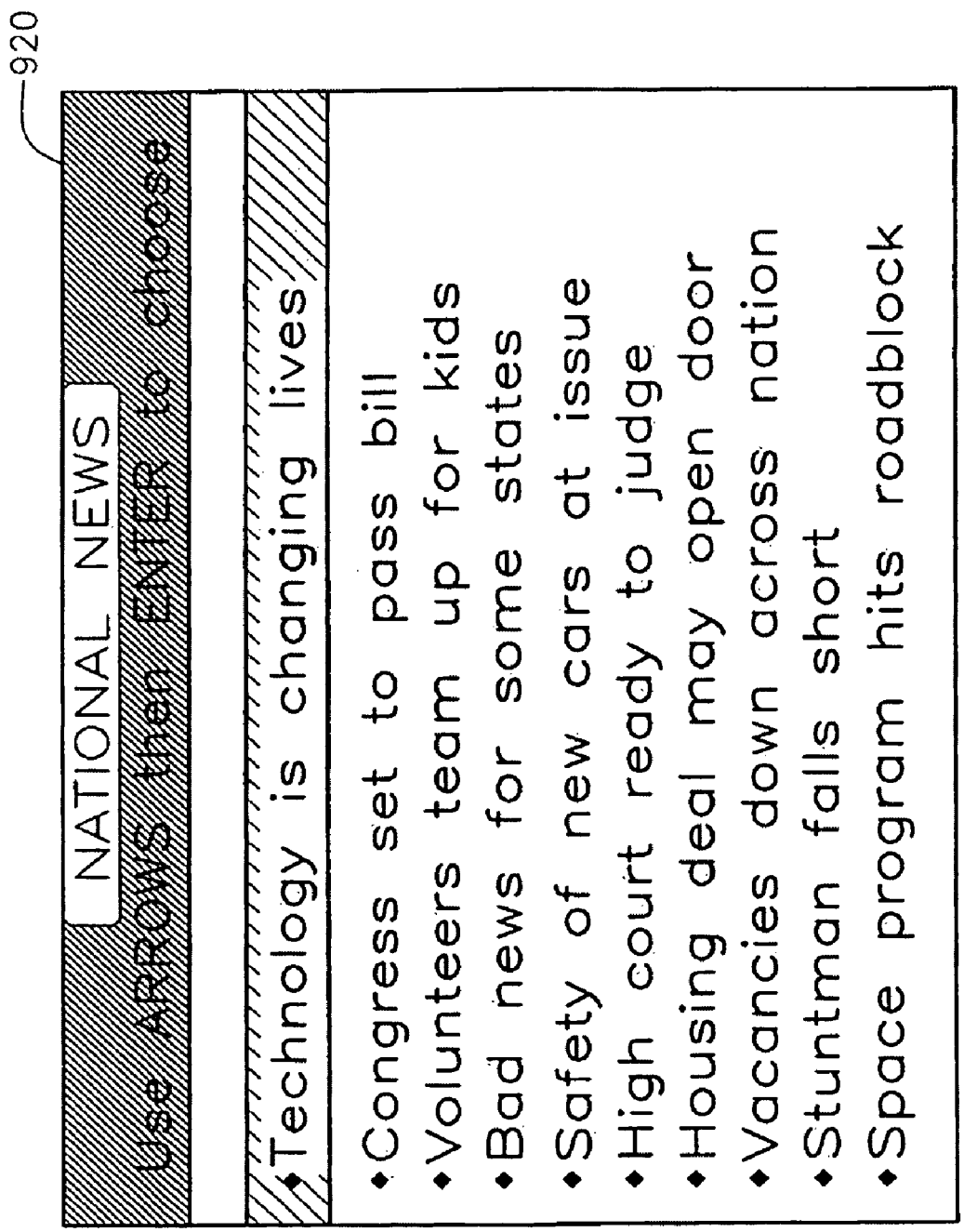
FIG. 9(b) is an illustration of a submenu of the information guide with news highlighted.

In FIG. 9(a), the user has selected "National News." FIG. 9(b) is an illustration of a submenu 920 of information guide screen 900. As can be seen, submenu 920 further breaks "National News" down into the different headlines. In a preferred embodiment, the user may tune to CNN or other Network News Station from submenu 920. The system operator may charge a fee for this service, and may allow the user to tune to one or more Network News Station depending on the fees paid by the Network News Providers. Hence, CNN, for example, may pay a premium fee to be the only News Station that the user may connect to from submenu 920. Alternatively, CNN may pay a regular fee, and the user may tune to CNN, and other News Stations that have paid the regular fee.

Figure 9C:
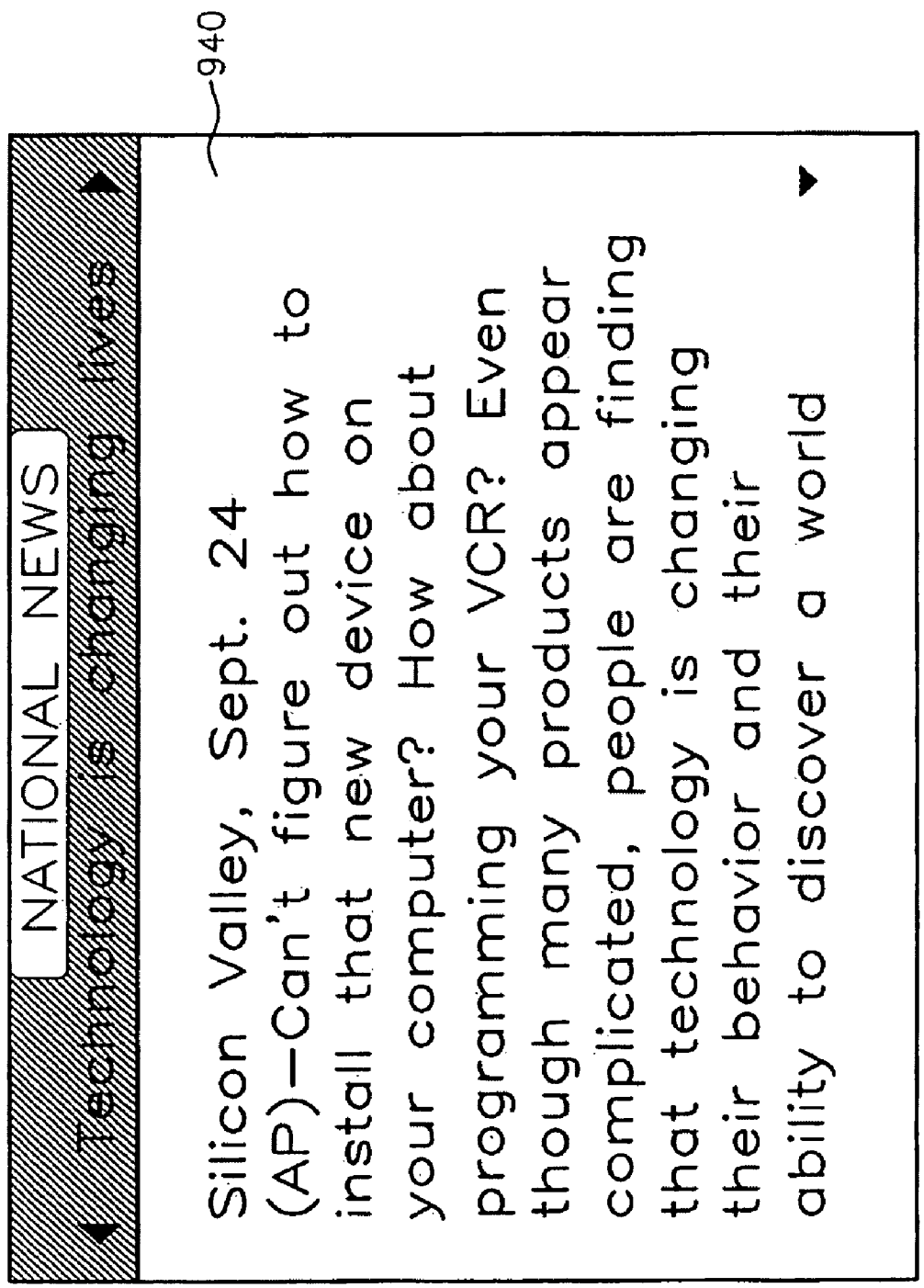
FIG. 9(c) is an illustration of a news information screen.

From submenu 920, the user may highlight one of the headlines to select the headline and obtain the story. In this example, the story is displayed according to FIG. 9(c) in a news information screen 940. Alternatively, the user may click on a video icon (not shown) on screen 940 to further view a video clip relating to the story. The system may access the video clip via the video network, i.e., via cable, direct broadcast satellite, and the like. The video clip could be generated from compressed data, and if so, it may be presented in a PIP tickler format. Alternatively, the system may link to, for example, CNN's website, and retrieve an Audio-Video-Interleaved (AVI) file to present a moving picture related to the headline to the user. The video icon may also be available from submenu screen 920. Hence the user may click on the icon to view a video clip of the headline directly instead of reading the story. In another preferred embodiment, the system may automatically activate a video clip corresponding to whichever news headline that the user has selected, thereby eliminating the need for the user to activate an icon in order to view the video clip.

Figure 10A:
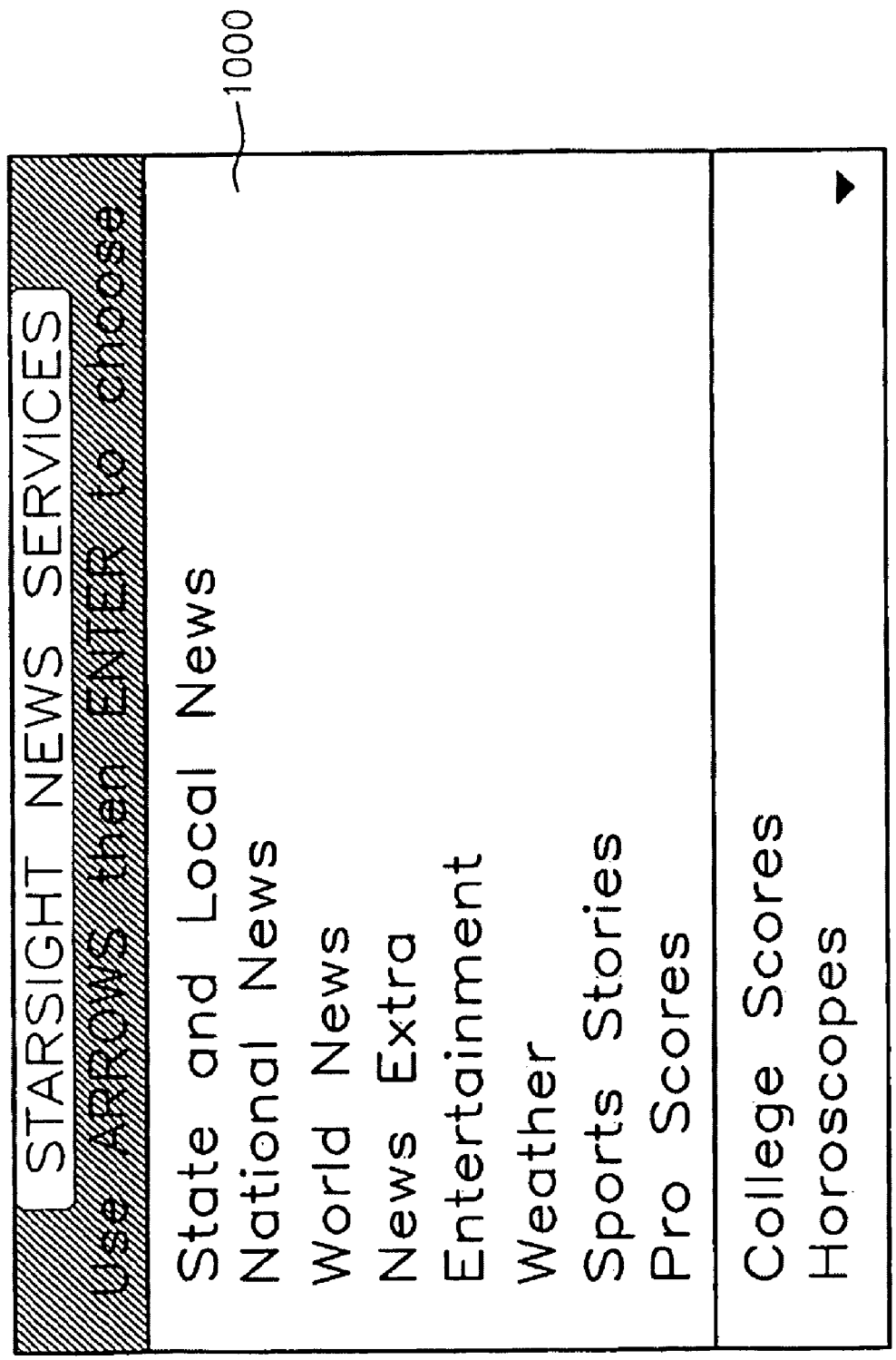
FIG. 10(a) is an illustration of an alternate embodiment of a submenu of the information guide with sports highlighted.

FIG. 10(a) is an illustration of a information guide screen 1000 that is similar to information guide screen 900 except in FIG. 10(a), the user has selected "Pro Scores" instead of "National News." FIG. 10(b) is an illustration of a submenu 1020, which further breaks down "Pro Scores" into the different scoreboards. In a preferred embodiment, similar to the news submenu 920, the user may tune to ESPN or other Sports Station from sports submenu 1020. The system operator may also charge a fee for this service, and may allow the user to tune to one or more Sports Station depending on the fees paid by the Providers. Hence, ESPN may also, for example, pay a premium fee to be the only Sports Station that the user may connect to from submenu 1020. Alternatively, ESPN may pay a regular fee, and the user may tune to ESPN, and other Sports Stations that have also paid the regular fee.

From submenu 1020, the user may highlight one of the scoreboards to select the scoreboard and obtain scores pertaining to the board. In this example, the scores are displayed according to FIG. 10(c) in a sports information screen 1040. As shown in screen 1040, the scores are presented in grid format. Other arrangements may of course be used, so long as the information is presented in a logical fashion. From information screen 1040, the user may also click on a video icon (not shown) to further view a video clip relating to the game. As discussed, the system may access the video clip via the video network, i.e., via cable, direct broadcast satellite, and the like, and this video clip could be generated from compressed data. Alternatively, the system may link to, for example, the NFL's website, and retrieve an AVI file, if it is available, to present a moving picture related to the game to the user.

Figure 11A:
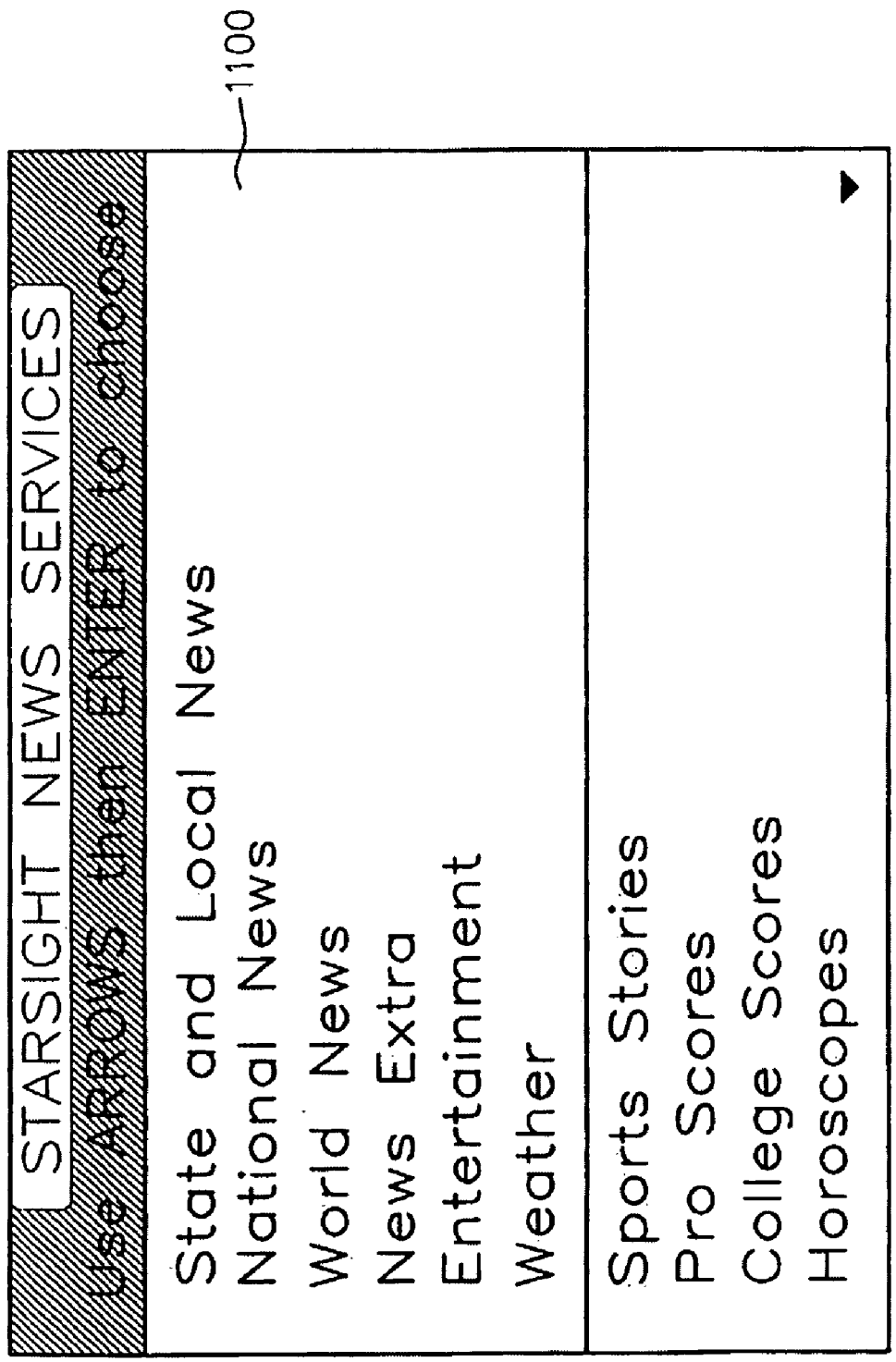
FIG. 11(a) is an illustration of an alternate embodiment of the information screen with weather highlighted.

FIG. 11(a) is an illustration of a information guide screen 1100 that is also similar to information guide screen 900 except in FIG. 11(a), the user has selected "Weather" instead of "National News." FIG. 11(b) is an illustration of a submenu 1120, which further breaks down "Weather" into weather forecasts for the different geographic regions. The system displays different local weather forecasts depending on the location of the user. In the example as shown in FIG. 11(b), the user is located in California, along the East Bay; hence, the local weather forecasts are for the different East Bay cities. In another embodiment, the user may specify the geographic region. Hence, the user may obtain also weather information for regions other than where the user is located.

Figure 11D:
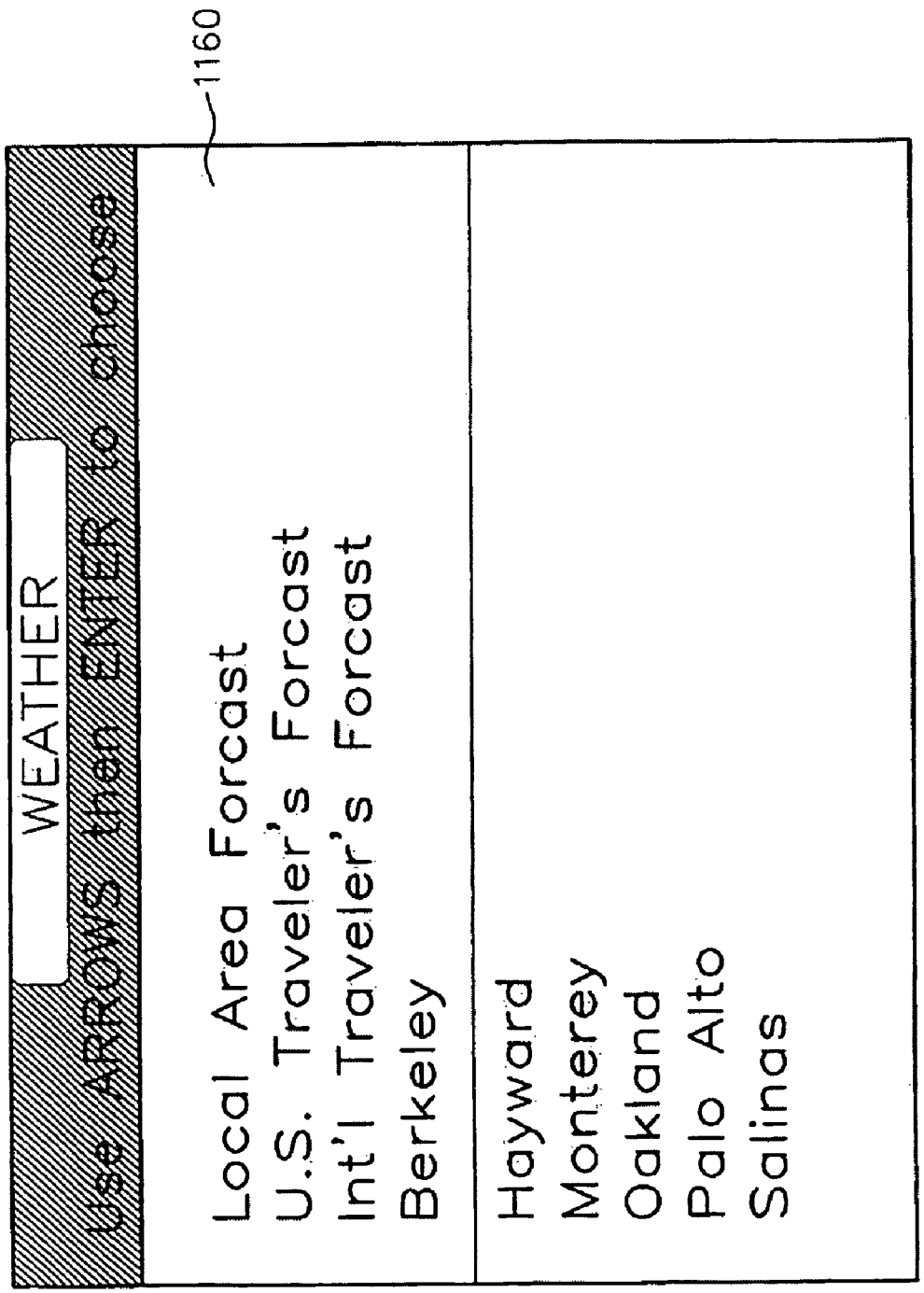
FIG. 11(d) is an illustration of an alternate embodiment of the weather submenu.
Figure 11E:
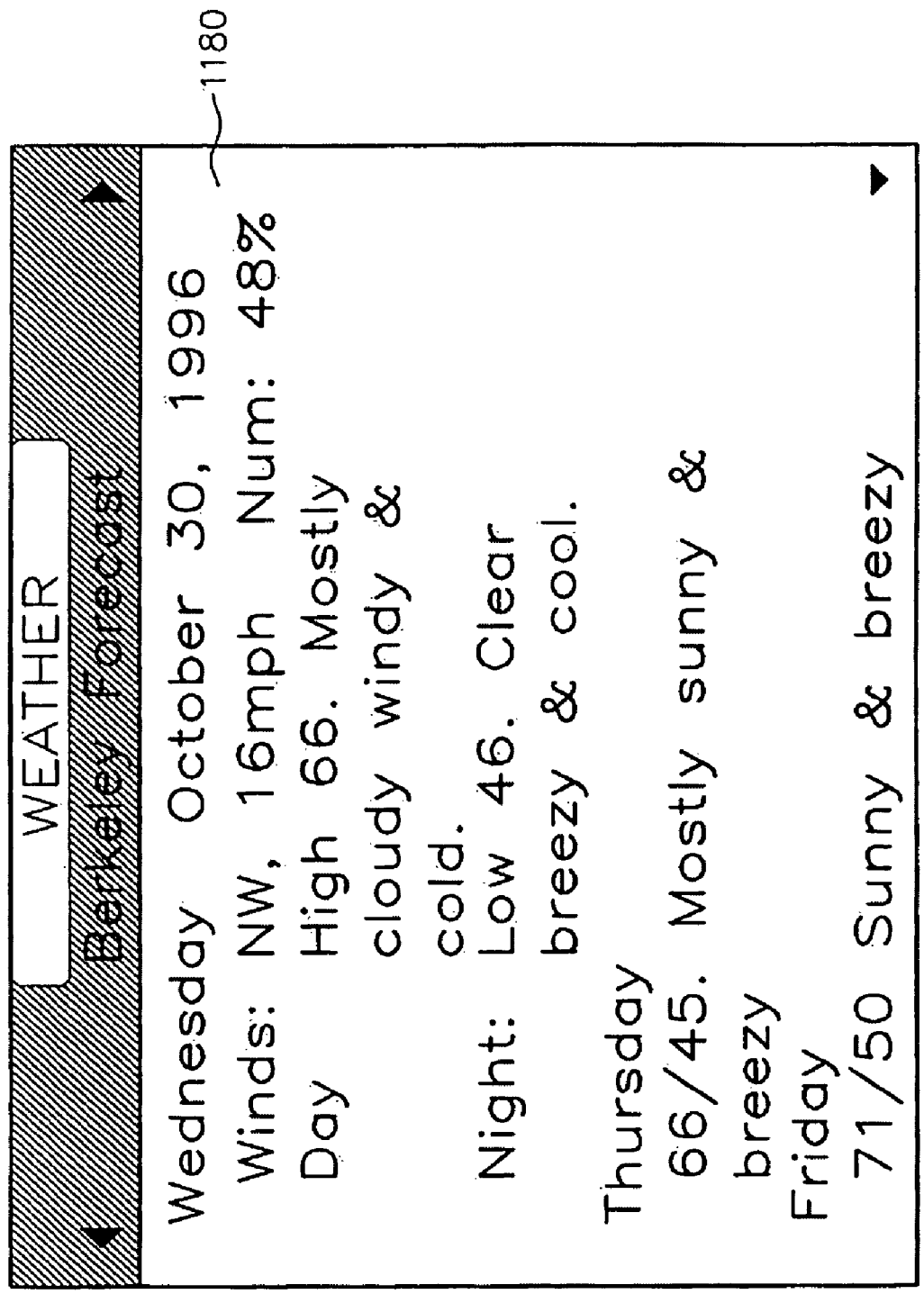
FIG. 11(e) is an illustration of an alternate embodiment of a weather information screen.

In FIG. 11(b), the user has selected weather forecast for the United States, hence, the user may be shown a U.S. weather information screen 1140 (FIG. 11(c)), which displays the information in a column fashion. Other display arrangements that displays the information in a logical manner may also be used; furthermore, the information may be more detailed than that shown in information screen 1140. FIG. 11(d) is an illustration of a submenu 1160 that is similar to submenu 1120 except in FIG. 11(d), the user has selected weather forecast for Berkeley, instead of for the U.S. Hence, the user is shown a forecast of Berkeley weather in a information screen 1180 (FIG. 11(e)) instead. Since the weather information is for a local region, it is more detailed and provides more information to the user. As shown in FIG. 11(e), the weather information is displayed in a row fashion. Again, other arrangements for presenting the weather information may also be used as long as the information is organized in a logical manner.

Figure 12:
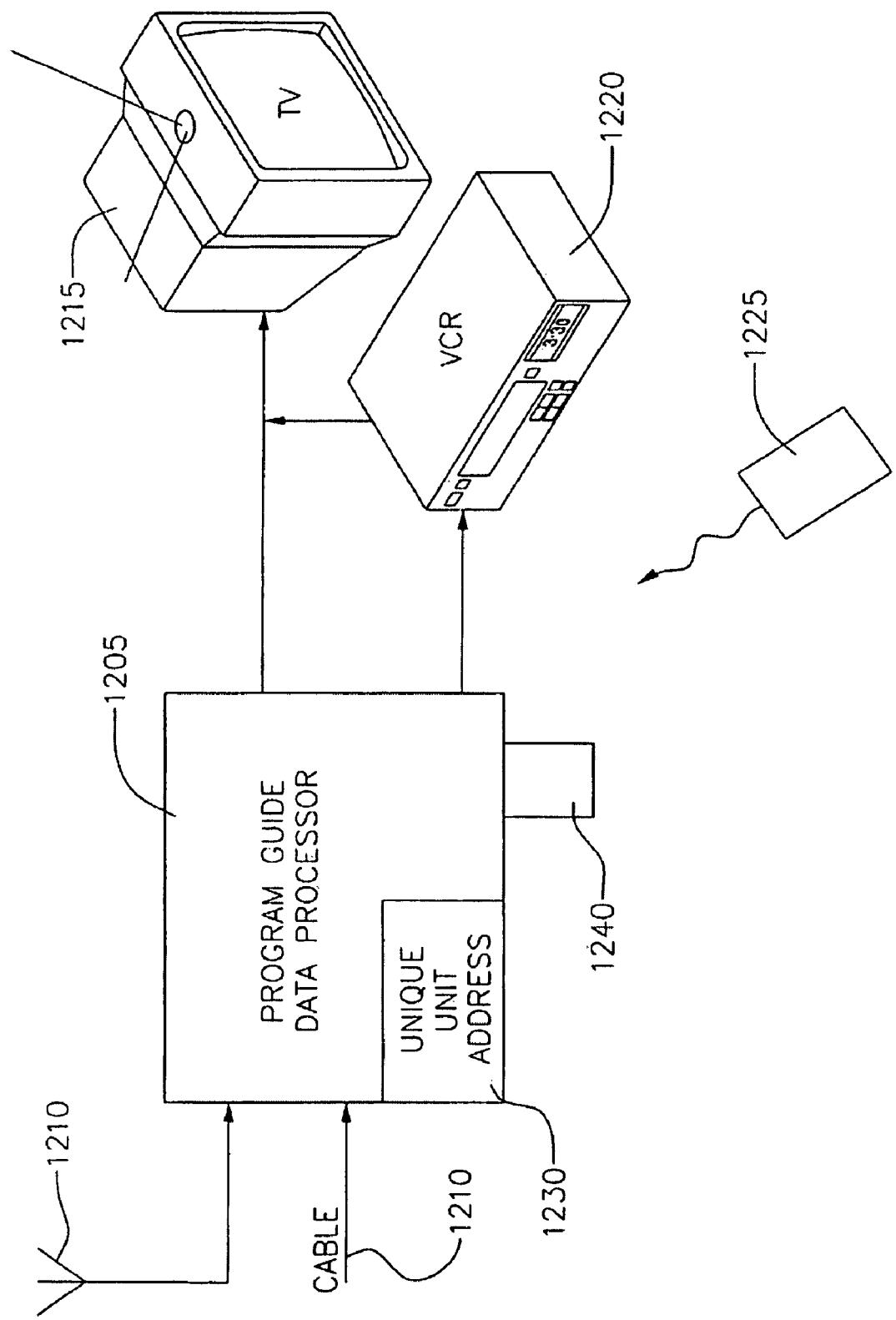
FIG. 12 illustrates the hardware elements of a preferred embodiment of the invention.

FIG. 12 illustrates the hardware elements of one particular embodiment of the invention. As shown, the configuration preferably utilizes a program guide controller 1205 (for example, a data processor), one or more televisions sources 1210, and a TV or computer monitor 1215. These systems may also include a VCR 1220 and a remote control 1225. Program guide system 1205 may be a stand-alone device or it may be incorporated into another system such as a television, a cable decoder, a computer, a PCTV, or a VCR. As shown, program guide system 1205 has a unit address 1230 that is unique to each system. Hence, the system operators may identify system 1205 according to its unique unit address thereby enabling the system operators to send messages to specific users.

Another embodiment of the present invention includes a plug-in program guide controller module 1240. Module 1240 determines the extent of program guide 1205's capabilities. Thus module 1240 may only allow program guide 1205 to provide a non-interactive guide or the guide may not have information icons. When the user wants to upgrade program guide 1205, for example, adding interactive capability, information icons, or more detailed category searching, module 1240 may be replaced with a different module authorizing more extensive guide capabilities. This embodiment has the distinct advantage of allowing the system to be significantly altered without requiring major hardware changes. Since the user upgrades module 1240 to upgrade the guide, the user does not need the system operator to provide technical support. In this scenario the user would merely procure a different module 1240, install the new module into the program guide system 1205, and pay the new fee set by the system operator for the new benefits.

Preferably the system operates under the control of software applications on a renewable computer memory. The memory for the software applications may be located in one or more ICs, for example, the plug-in module of the data processor, or in ROM, RAM, FLASH memory or any combination thereof. Accordingly, the disclosures and descriptions herein are intended to be illustrative, but not limiting, of the scope of the invention which is set forth in the following claims.

What is claimed is:

1. A method of displaying information in an interactive electronic program guide (IPG) comprising:
    displaying a plurality of television program listings, wherein each television program listing corresponds to a television program;
    providing a cursor;
    providing an interactive information region;
    displaying information personalized to a user in the interactive information region;
    receiving a first input from the user confirming receipt of the personalized information;
    displaying, responsive to the first input, advertisement information in the interactive information region in place of the personalized information, wherein the displayed advertisement information corresponds to a first television program;
    positioning the cursor over the interactive information region and receiving a second input from the user selecting the interactive advertisement information region over which the cursor is positioned; and
    displaying, responsive to the second input, further information about the first television program.

2. The method of claim 1, wherein the information personalized to the user includes information about an account of the user or emergency information.

3. The method of claim 1, wherein receiving the first input from the user further comprises receiving a selection of an icon to clear the personalized information.

4. The method of claim 1 further comprising displaying, responsive to the second input, a tune option that allows the user to tune to the first television program and a record option that allows the user to record the first television program.

5. The method of claim 1 further comprising allowing the user to schedule an autotuning to the first television program.

6. The method of claim 1, wherein the displaying the advertisement information further comprises displaying advertisement information about a pay-per-view program.

7. The method of claim 1, wherein the displaying the advertisement information further comprises displaying advertisement information about a merchandise.

8. The method of claim 1, wherein the displaying the advertisement information further comprises displaying advertisement information promoting a website.

9. The method of claim 8 further comprising accessing the website and displaying data from the website.

10. The method of claim 1, wherein the displaying the advertisement information further comprises displaying a video clip about the first television program.

11. A system for displaying information in an interactive electronic program guide (IPG) comprising:
    a display screen; and
    control circuitry configured to:
        display on the display screen a plurality of television program listings, wherein each television program listing corresponds to a television program;
        provide an interactive information region;
        display on the display screen information personalized to a user in the interactive information region; and
        receive a first input from the user confirming receipt of the personalized information;
        display on the display screen, responsive to the first input, advertisement information in the interactive information region in place of the personalized information, wherein the displayed advertisement information corresponds to a first television program;
        position the cursor over the interactive information region and receiving a second input from the user selecting the interactive advertisement information region over which the cursor is positioned; and
        display on the display screen, responsive to the second input, further information about the first television program.

12. The system of claim 11, wherein the information personalized to the user includes information about an account of the user or emergency information.

13. The system of claim 11, wherein the control circuitry is further configured to receive, as the first user input, a selection of an icon to clear the personalized information.

14. The system of claim 11, wherein the control circuitry is further configured to display on the display screen, responsive to the second input, a tune option that allows the user to tune to the first television program and a record option that allows the user to record the first television program.

15. The system of claim 11, wherein the control circuitry is further configured to, allow the user to schedule an autotuning to the first television program.

16. The system of claim 11, wherein the control circuitry is further configured to display on the display screen, advertisement information about a pay-per-view program.

17. The system of claim 11, wherein the displaying the advertisement information further comprises displaying advertisement information about a merchandise.

18. The system of claim 11, wherein the control circuitry is further configured to display on the display screen advertisement information in the interactive information region promoting a website.

19. The system of claim 18 wherein the control circuitry is further configured to access the website and display on the display screen data from the website.

20. The system of claim 11, wherein the control circuitry is further configured to display on the display screen a video clip about the first television program.

* * * * *